US012508693B2

(12) United States Patent
Shima

(10) Patent No.: US 12,508,693 B2
(45) Date of Patent: Dec. 30, 2025

(54) TECHNIQUE FOR CONTROLLING MOTOR IN ELECTRIC POWER TOOL

(71) Applicant: MAKITA CORPORATION, Anjo (JP)

(72) Inventor: Kunihisa Shima, Anjo (JP)

(73) Assignee: MAKITA CORPORATION, Anjo (JP)

( * ) Notice: Subject to any disclaimer, the term of this patent is extended or adjusted under 35 U.S.C. 154(b) by 558 days.

(21) Appl. No.: 17/959,702

(22) Filed: Oct. 4, 2022

(65) Prior Publication Data

US 2023/0106949 A1  Apr. 6, 2023

(30) Foreign Application Priority Data

Oct. 6, 2021  (JP) .................. 2021-164980

(51) Int. Cl.
B25B 21/00 (2006.01)
B25B 23/147 (2006.01)
B25F 5/02 (2006.01)
H02P 3/18 (2006.01)
H02P 27/08 (2006.01)

(52) U.S. Cl.
CPC ............ *B25B 21/00* (2013.01); *B25B 23/147* (2013.01); *B25F 5/02* (2013.01); *H02P 3/18* (2013.01); *H02P 27/08* (2013.01)

(58) Field of Classification Search
CPC ......... B25B 21/00; B25B 23/147; B25F 5/02; H02P 3/18; H02P 27/08
See application file for complete search history.

(56) References Cited

U.S. PATENT DOCUMENTS

2017/0093321 A1* 3/2017 Ichikawa ................ H02P 27/08
2018/0152120 A1  5/2018 Yabuguchi

FOREIGN PATENT DOCUMENTS

JP        6884561 B2    6/2021
WO   WO-2013183566 A1 * 12/2013 ............. B25B 21/00

* cited by examiner

Primary Examiner — Michelle Lopez
(74) Attorney, Agent, or Firm — Oliff PLC

(57) ABSTRACT

An electric power tool in one aspect of the present disclosure includes a motor, first and second paths respectively and electrically connect the motor to a DC power supply, a first switch on the first path, a second switch on a the second path, a first drive circuit, and first and second holding circuits. The first drive circuit (i) switches the first switch to the ON-state and (ii) outputs a first drive signal to the second switch. The first holding circuit holds the second switch in the ON-state while the first drive circuit is activated. The second holding circuit holds the first switch in the OFF-state based on the second switch being held in the ON-state.

19 Claims, 17 Drawing Sheets

<BRAKE PREPARATION PROCESS>
(LOW-SIDE-PWM PROCESS; NON-COMPLEMENTARY)

[INITIAL HOLDING PROCESS]

[FIRST PROCESS]

[SECOND PROCESS]

TECHNIQUE FOR CONTROLLING MOTOR IN ELECTRIC POWER TOOL

CROSS-REFERENCE TO RELATED APPLICATIONS

This application claims the benefit of Japanese patent application No. 2021-164980 filed with the Japan Patent Office on Oct. 6, 2021 and the entire disclosure of which is incorporated herein by reference.

BACKGROUND

The present disclosure relates to an electric power tool.

Japanese Patent No. 6884561 discloses an electric work machine including a control circuit, a 3-phase bridge circuit, and a motor. The 3-phase bridge circuit supplies an electric power of a battery to the motor to thereby drive the motor. The 3-phase bridge circuit includes three high-side switches and three low-side switches. In order to drive the motor, the control circuit (i) maintains a first high-side switch in an ON-state and (ii) periodically turning on and off a first low-side switch with a pulse width modulated signal. The first high-side switch corresponds to any one of the high-side switches. The first low-side switch corresponds to any one of the low-side switches.

When the motor is required to stop, the control circuit performs a prescribed control for inhibiting a current regeneration from the motor to the battery. In the prescribed control, the control circuit (i) hold the first high-side switch in the ON-state and (ii) hold the first low-side switch in an OFF-state. The control circuit holds all of the high-side switches and the low-side switches in the OFF-state after the execution of the prescribed control.

SUMMARY

In the above described electric work machine, after all the high-side switches and the low-side switches are held in the OFF-state, the motor can be kept stopped by braking the motor. One of the methods to brake the motor is a dynamic braking. However, in the above described electric work machine, the prescribed control is continued until the current flowing through the motor falls down to zero (e.g. for several milliseconds). Furthermore, after the execution of the prescribed control, all the high-side switches and the low-side switches are held in the OFF-state for a specified period of time (e.g. several milliseconds). Thus, it is difficult to apply the dynamic braking immediately after the motor is required to stop.

In one aspect of the present disclosure, it is desirable in an electric power tool to quickly brake a motor while inhibiting a regeneration of an electric power from the motor to a battery.

One aspect of the present disclosure provides an electric power tool including a motor. The motor includes a first terminal and a second terminal.

The electric power tool includes a first path. The first path electrically connects the first terminal to a positive electrode of a DC power supply. The electric power tool includes a second path. The second path electrically connects the second terminal to a negative electrode of the DC power supply.

The electric power tool includes first and second switches. The first and second switches are respectively on the first and second path. The first and second switches are switched between an ON-state and an OFF-state. The first and second switches in the ON-state respectively complete the first and second paths. The first and second switches in the OFF-state respectively interrupt the first and second paths.

The electric power tool includes a first drive circuit. The first drive circuit (i) switches the first switch to the ON-state and (ii) outputs a first drive signal to the second switch. The first drive signal is in the form of a pulse width modulated signal.

The control circuit includes a first holding circuit. The first holding circuit holds the second switch in the ON-state while the first drive circuit is activated.

The control circuit includes a second holding circuit. The second holding circuit holds the first switch in the OFF-state based on the second switch being held in the ON-state.

In such an electric power tool, the second switch is held in the ON-state by the first holding circuit while the first drive circuit is activated, and then, the first switch is held in the OFF-state by the second holding circuit.

The time required for the first holding circuit to hold the second switch in the ON-state is the time sufficient to switch the second switch from the OFF-state to the ON-state.

The time required for the second holding circuit to hold the first switch in the OFF-state is the time sufficient to switch the first switch from the ON-state to the OFF-state. That is, the total time required for the operation of the first and second holding circuits is shorter than the time required to apply the dynamic braking after the stop condition is satisfied in the above described Japanese Patent No. 6884561.

As a result, such a power tool can quickly brake the motor while inhibiting the regeneration of electric power from the motor to the DC power supply.

Another aspect of the present disclosure is a method for controlling a motor in an electric power tool, the method including:

completing a first path in the electric power tool, the first path being configured to electrically connect a first terminal of the motor to a positive electrode of a DC power supply;

periodically completing or interrupting a second path in the electric power tool while the first path is completed, the second path being configured to electrically connect a second terminal of the motor to a negative electrode of the DC power supply;

subsequently holding the second path completed; and interrupting the first path while the second path is held completed.

With this method, the electric power tool can quickly brake the motor while inhibiting the regeneration of electric power from the motor to the DC power supply.

BRIEF DESCRIPTION OF THE DRAWINGS

Example embodiments of the present disclosure will be described hereinafter by way of example with reference to the accompanying drawings, in which.

DETAILED DESCRIPTION OF EXEMPLARY EMBODIMENTS

1. Summary of Embodiments

Figure 1:
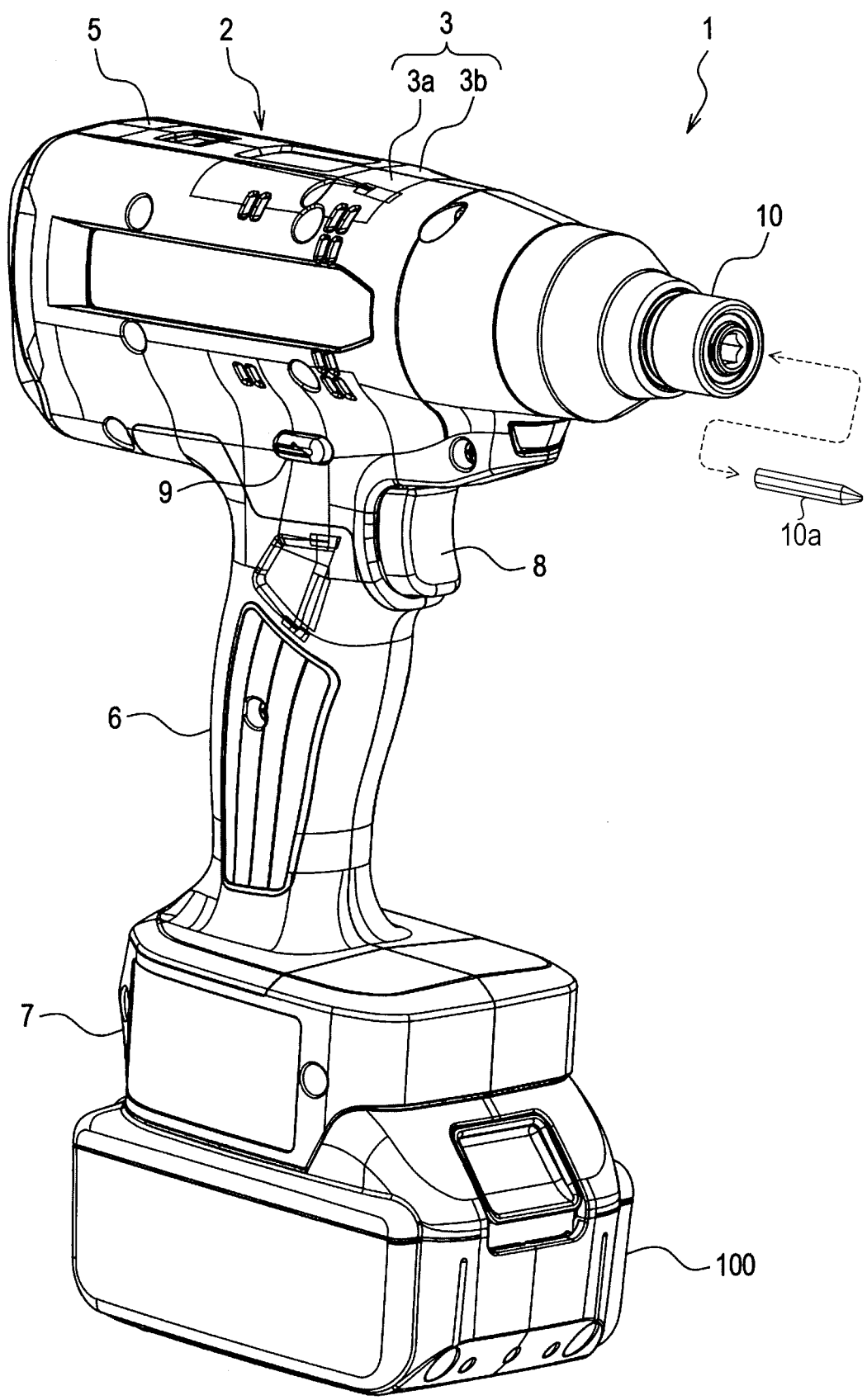
FIG. 1 is a perspective view showing an electric power tool of a first embodiment seen from the diagonal front.

One embodiment may provide an electric power tool including at least any one of the following features 1 through 13.

Feature 1: a motor including a first terminal and a second terminal;

Feature 2: a first path configured to electrically connect the first terminal to a positive electrode of a DC power supply;

Feature 3: a second path configured to electrically connect the second terminal to a negative electrode of the DC power supply;

Feature 4: a third path configured to electrically connect the second terminal to the positive electrode;

Feature 5: a fourth path configured to electrically connect the first terminal to the negative electrode;

Feature 6: a first switch on the first path, the first switch being configured to be switched between an ON-state and an OFF-state, the first switch in the ON-state being configured to complete the first path, the first switch in the OFF-state being configured to interrupt the first path;

Feature 7: a second switch on the second path, the second switch being configured to be switched between the ON-state and the OFF-state, the second switch in the ON-state being configured to complete the second path, the second switch in the OFF-state being configured to interrupt the second path;

Feature 8: a third switch on the third path, the third switch being configured to be switched between the ON-state and the OFF-state, the third switch in the ON-state being configured to complete the third path, the third switch in the OFF-state being configured to interrupt the third path;

Feature 9: a fourth switch on the fourth path, the fourth switch being configured to be switched between the ON-state and the OFF-state, the fourth switch in the ON-state being configured to complete the fourth path, the fourth switch in the OFF-state being configured to interrupt the fourth path;

Feature 10: a first drive circuit configured (i) to switch the first switch to the ON-state and (ii) to output a first drive signal to the second switch, the first drive signal being in the form of a pulse width modulated signal;

Feature 11: a first holding circuit configured to hold the second switch in the ON-state while the first drive circuit is activated;

Feature 12: a second holding circuit configured to hold the first switch in the OFF-state based on the second switch being held in the ON-state; and Feature 13: a braking circuit configured to hold the second switch and the fourth switch in the ON-state based on the first switch being held in the OFF-state.

Upon the activation of the braking circuit, the dynamic braking (or regenerative braking or short-circuit braking) is activated. That is, the first terminal is electrically short-circuited to the second terminal via the second and fourth switches, whereby the motor is braked.

The second holding circuit can inhibit the activation of the braking circuit while the first switch is in the ON-state. In other words, the second holding circuit can inhibit the positive electrode and the negative electrode from short-circuiting caused by both the first and fourth switches being turned on.

The first holding circuit can inhibit the activation of the second holding circuit while the second switch is in the OFF-state. In other words, the first holding circuit can inhibit, by both the first and second switches being turned off, the regeneration of electric power from the motor to the DC power supply.

The second holding circuit does not require to hold the first switch in the OFF-state until no current flows through the motor as in the above-described prescribed control. Thus, the second holding circuit can be activated quickly after the first holding circuit is activated. Furthermore, the braking circuit can be activated quickly after the second holding circuit is activated. The total time required for the operation of the first and second holding circuits is shorter than the time required to apply the dynamic braking after the stop condition is satisfied in the above described Japanese Patent No. 6884561.

Thus, the electric power tool including at least features 1-13 can quickly activate the dynamic braking while inhibiting the regeneration of electric power from the motor to the DC power supply.

The first drive circuit may periodically turn on or off the second switch by the first drive signal.

The activation of the first drive circuit may provide the electric power of the DC power supply to the motor to drive the motor.

The first holding circuit may disable the driving of the second switch, the driving caused by the first drive circuit, and then hold the second switch in the ON-state. Additionally/alternatively, the first drive circuit may stop the driving of the second switch based on the first holding circuit being activated, or to be activated.

The second holding circuit may be activated during or after the activation of the first holding circuit. That is, the second holding circuit is configured to hold the first switch in the OFF-state based on the second switch being held in the ON-state by the first holding circuit.

The braking circuit may be activated during or after the activation of the second holding circuit. That is, the braking circuit may hold the second switch and the fourth switch in the ON-state based on the first switch being held in the OFF-state by the second holding circuit.

One embodiment may include the following Feature 14 in addition to or in place of at least any one of the above-described Features 1 through 13:

Feature 14: the first holding circuit is configured to hold the second switch in the ON-state based on the motor being required to stop (or based on a stop requirement being satisfied) while the first drive circuit is activated.

The stop requirement may be required to stop the motor.

Thus, in the electric power tool including at least features 1-14, in a case where the stop requirement is satisfied, it is possible to quickly activate the dynamic braking while inhibiting the regeneration of electric power from the motor to the DC power supply.

One embodiment may include the following Feature 15 and/or 16 in addition to or in place of at least any one of the above-described Features 1 through 14:

Feature 15: a first rectifier connected to the fourth path so as to bypass the fourth switch, the first rectifier being configured to pass an electric current in a first unidirection, and the first unidirection being directed from the negative electrode to the first terminal via the first rectifier; and Feature 16: a second rectifier connected to the third path so as to bypass the third switch, the second rectifier being configured to pass an electric current in a second unidirection, and the second unidirection being directed from the second terminal to the positive electrode via the second rectifier.

The first rectifier may inhibit or prevent the electric current flowing in a reverse direction of the first unidirection. The second rectifier may inhibit or prevent the electric current flowing in a reverse direction of the second unidirection.

In the electric power tool including at least features 1 through 13, and 15 upon the activation of the second holding circuit, a first circulating current (or a first flyback current) may flow through the motor, the second switch, and the first rectifier. In the electric power tool including at least features 1 through 13, and 16, a second circulating current (or a second flyback current) may flow through the motor, the second rectifier, and the first switch while the first drive circuit is activated.

One embodiment may include the following Feature 17 in addition to or in place of at least any one of the above-described Features 1 through 16:

Feature 17: the first drive circuit is configured to switch the third switch to the ON-state in at least a part of an off-period, the off-period corresponding to a time period when the second switch is switched to the OFF-state.

The off-period may correspond to a time period when the second switch is switched to the OFF-state by the first drive circuit.

In the electric power tool including at least features 1 through 13 and 15 through 17, in response to the second switch being off, the second circulating current can flow through the motor, the third switch, and the first switch. That is, it is possible to inhibit or prevent the second circulating current from flowing through the second rectifier. Thus, it is possible to inhibit or prevent the heat generation in the second rectifier due to the second circulating current.

One embodiment may include the following Feature 18 and/or 19 in addition to or in place of at least any one of the above-described Features 1 through 17:

Feature 18: a third holding circuit configured to hold the third switch in the OFF-state while the first drive circuit is activated;

Feature 19: the first holding circuit is configured to hold the second switch in the ON-state based on the third switch being held in the OFF-state by, for example, the third holding circuit.

The third holding circuit may be configured to hold the third switch in the OFF-state based on the motor being required to stop (or based on the stop requirement being satisfied) while the first drive circuit is activated.

The third holding circuit may (i) disable the driving of the third switch, the driving caused by the first drive circuit, and then (ii) hold the third switch in the OFF-state. Additionally/alternatively, the first drive circuit may stop the driving of the third switch based on the third holding circuit being activated or to be activated.

In the electric power tool including at least features 1 through 14 and 17 through 19, the third switch is held in the OFF-state by the third holding circuit before the second switch is held in the ON-state by the first holding circuit. Thus, it is possible to inhibit the second switch from being switched to the ON-state while the third switch is in the ON-state (i.e. it is possible to inhibit both the third switch and the second switch from being in the ON-state).

In the electric power tool including at least features 1 through 19, the time required for the third holding circuit to hold the third switch in the OFF-state (e.g. the time required from the start of the activation of the third holding circuit to the start of the activation of the first holding circuit) is sufficient to switch the third switch to the OFF-state. Thus, in a case where the stop requirement is satisfied, it is possible to inhibit the regeneration of electric power from the motor to the DC power supply, and it is possible to quickly and properly apply the dynamic braking.

One embodiment may include the following Feature 20 and/or 21 in addition to or in place of at least any one of the above-described Features 1 through 19:

Feature 20: the first holding circuit waits until the first drive circuit switches the second switch to the ON-state, based on the motor being required to stop (or based on the stop requirement being satisfied) while the second switch is switched to the OFF-state (by, for example, the first drive circuit).

Feature 21: the first holding circuit holds the second switch in the ON-state based on the second switch being switched to the ON-state (e.g. by the first drive circuit).

In the electric power tool including at least features 1 through 13, 17, 20, and 21, it is possible to inhibit the activation of the first holding circuit while the third switch is in the ON-state (i.e. it is possible to inhibit both the third switch and the second switch from being in the ON-state).

One embodiment may include at least any one of the following features 22 through 28 in addition to or in place of at least any one of the above features 1 through 21;

Feature 22: the motor is in the form of a brushless motor (or a brushless DC motor);

Feature 23: the motor further includes a third terminal;

Feature 24: a fifth path configured to electrically connect the third terminal to the positive electrode;

Feature 25: a sixth path configured to electrically connect the third terminal to the negative electrode;

Feature 26: a fifth switch on the fifth path and configured to be switched between the ON-state and the OFF-state, the fifth switch in the ON-state being configured to complete the fifth path, and the fifth switch in the OFF-state being configured to interrupt the fifth path;

Feature 27: a sixth switch on the sixth path and configured to be switched between the ON-state and the OFF-state, the sixth switch in the ON-state being configured to complete the sixth path, and the sixth switch in the OFF-state being configured to interrupt the sixth path; and Feature 28: the braking circuit is configured to hold the second switch, the fourth switch and the sixth switch in the ON-state based on the first switch being held in the OFF-state.

The braking circuit may hold the second switch, the fourth switch and the sixth switch in the ON-state based on the first switch being held in the OFF-state by the second holding circuit.

In the electric power tool including at least features 1 through 14 and 22 through 28, in a case where the stop requirement is satisfied, it is possible to quickly apply a braking force of the dynamic braking to the brushless motor while inhibiting the regeneration of electric power from the brushless motor to the DC power supply.

One embodiment may include the following Feature 29 and/or 30 in addition to or in place of at least any one of the above-described Features 1 through 28:

Feature 29: a second drive circuit configured (i) to switch the second switch to the ON-state and (ii) to output a second drive signal to the first switch, the second drive signal being in the form of a pulse width modulated signal; and Feature 30: a fourth holding circuit configured to hold the first switch in the OFF-state while the second drive circuit is activated.

The fourth holding circuit may be configured to hold the first switch in the OFF-state based on the motor being required to stop (or based on the stop requirement being satisfied) while the second drive circuit is activated.

The braking circuit may be activated based on the first switch being held in the OFF-state by the fourth holding circuit.

In the electric power tool including at least features 1 through 13, 29, and 30, the first switch, which has been driven based on the second drive signal, is held in the OFF-state before the braking circuit is activated. Thus, it is possible to inhibit the dynamic braking is activated while the first switch is in the ON-state (i.e. it is possible to inhibit both the first switch and the fourth switch from being in the ON-state). The fourth holding circuit is not required to hold the first switch in the OFF-state until no current flows through the motor as in the above-described prescribed control. Thus, it is possible to quickly activate the dynamic braking after the start of the activation of the fourth holding circuit.

One embodiment may include the following Feature 31 and/or 32 in addition to or in place of at least any one of the above-described Features 1 through 30:

Feature 31: a torque detector configured to detect a magnitude of a load torque, the load torque being applied to the motor; and Feature 32: the motor is required to stop (or the stop requirement is satisfied) in response to the magnitude of the load torque having reached a threshold.

In the electric power tool including at least features 1 through 14, 31, and 32, it is possible to inhibit the load torque from exceeding the threshold.

One embodiment may include the following Feature 33 and/or 34 in addition to or in place of at least any one of the above-described Features 1 through 32:

Feature 33: a control circuit; and

Feature 34: the control circuit includes at least one of the first drive circuit, the second drive circuit, the first holding circuit, the second holding circuit, the third holding circuit, the fourth holding circuit, the braking circuit and the torque detector.

One embodiment may provide a method of controlling a motor in an electric power tool including at least any one of features 35 through 38 as described below.

Feature 35: completing a first path in the electric power tool, the first path being configured to electrically connect a first terminal of the motor to a positive electrode of a DC power supply;

Feature 36: periodically completing or interrupting a second path in the electric power tool while the first path is completed, the second path being configured to electrically connect a second terminal of the motor to a negative electrode of the DC power supply;

Feature 37: subsequently holding the second path completed; and

Feature 38: interrupting the first path while the second path is held completed.

By the method including the features 35 through 38, it is possible to quickly brake the motor while inhibiting the regeneration of electric power from the motor to the DC power supply.

In one embodiment, the above-described features 1 through 38 may be combined in any way.

In one embodiment, any of the above-described features 1 through 38 may be excluded.

Examples of the electric power tool may include various electric power tools used in work sites, such as do-it-yourself carpentry, manufacturing, gardening, and construction, specifically, electric power tools for masonry work, metalworking, and woodworking, work machines for gardening, devices for preparing an environment of work sites, more specifically, electric drivers, electric screw drivers, electric drills, electric hammers, electric hammer drills, electric wrenches, electric grinders, electric circular saws, electric reciprocating saws, electric jig saws, electric cutters, electric chain saws, electric planes, electric nailing machines (including tackers), electric hedge trimmers, electric lawn mowers, electric lawn trimmers.

2. Specific Example Embodiments

Hereinafter, specific example embodiments will be described.

2-1. First Embodiment 2-1-1. Configuration of Electric Power Tool

Figure 2:
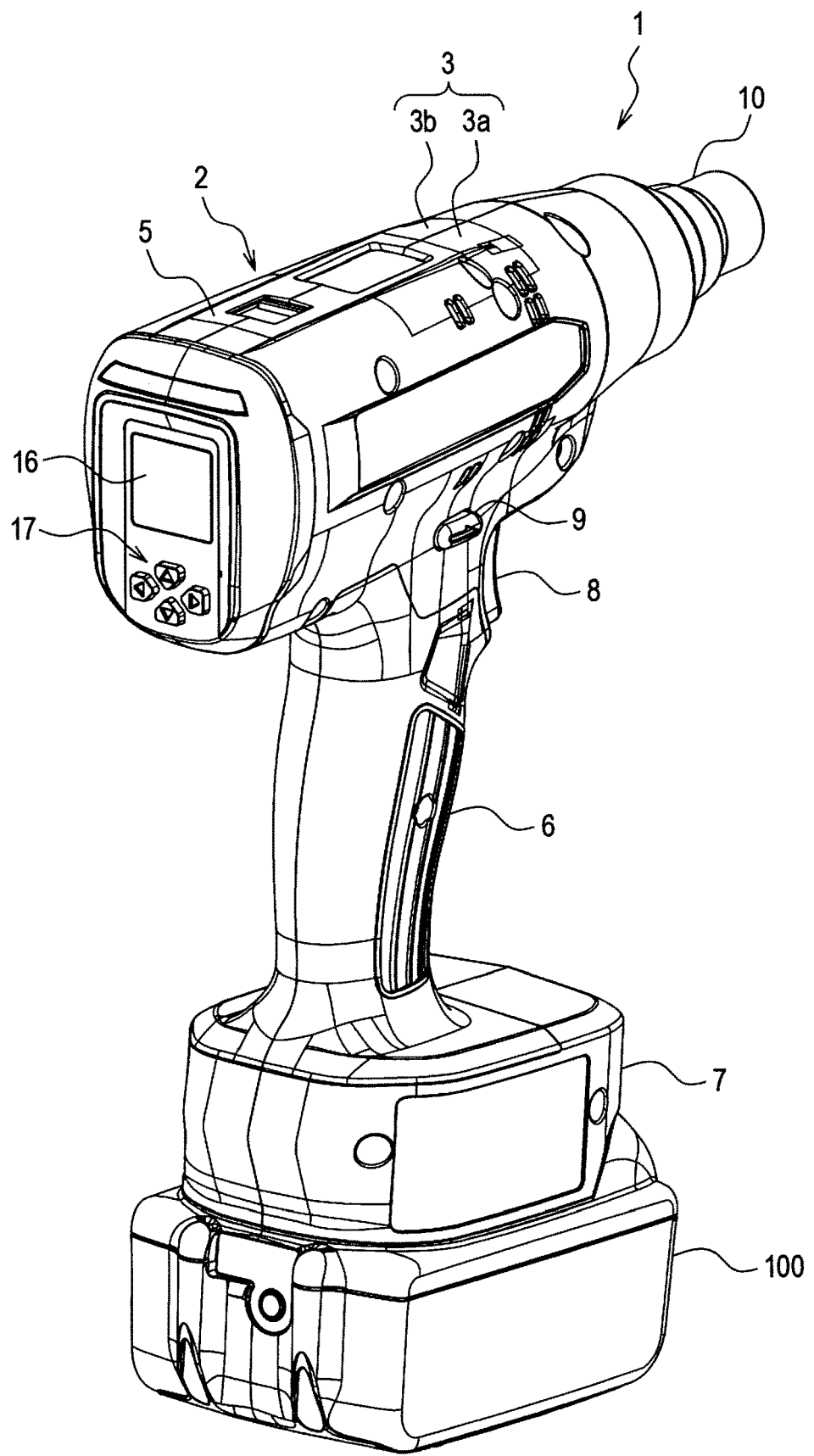
FIG. 2 is a perspective view showing the electric power tool of the first embodiment seen from the diagonal rear.
Figure 3:
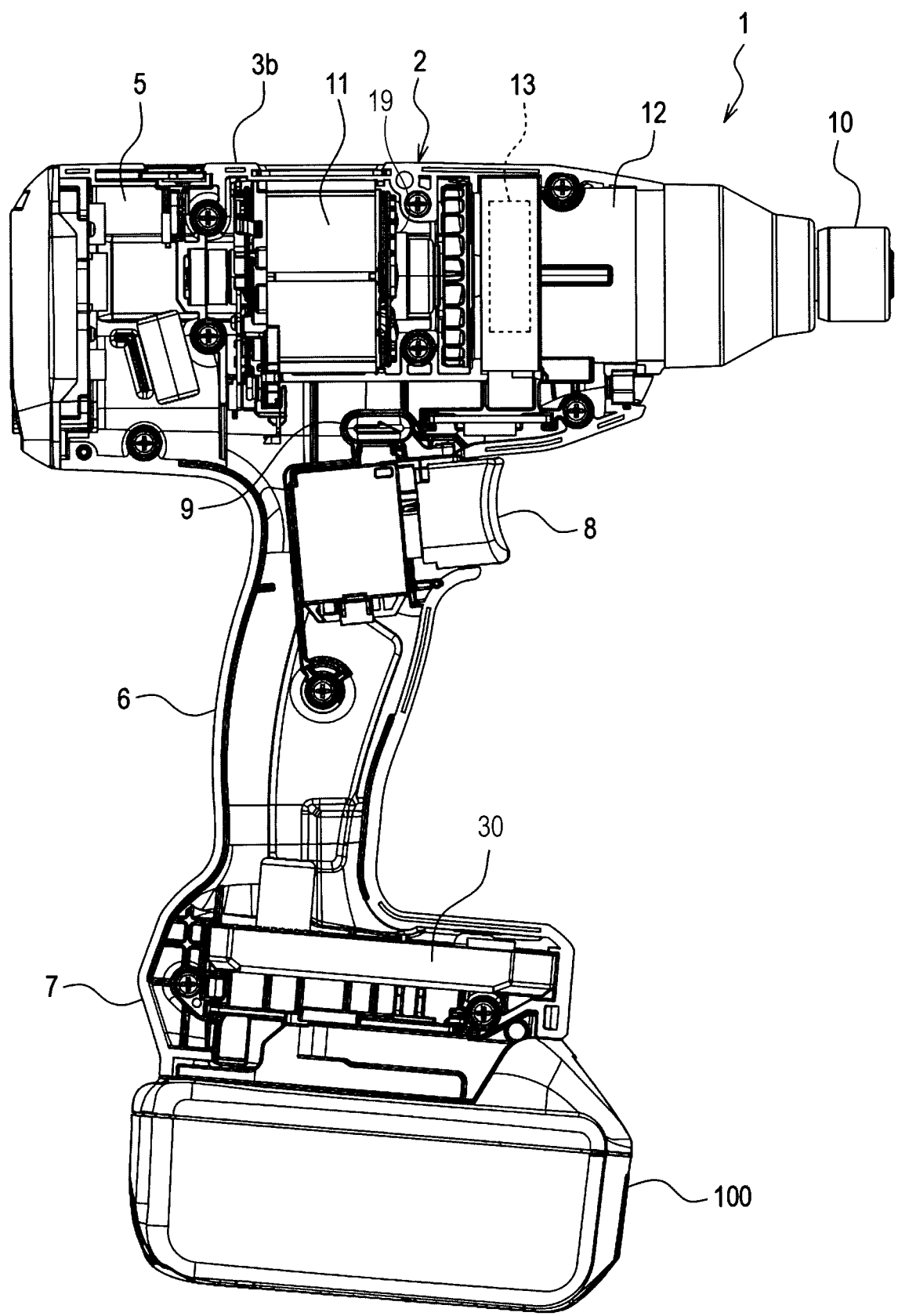
FIG. 3 is a side view of the electric power tool having a first half housing removed.

As shown in FIGS. 1 through 3, this first embodiment provides an electric power tool 1 in the form of a battery powered screwdriver (or a cordless screwdriver). The electric power tool 1 rotationally drives a fastening member, such as a screw. The electric power tool 1 of this first embodiment is driven by electric power (hereinafter, also referred to as "battery power") of a battery 101 described below (see FIG. 4). In other embodiments, that electric power tool 1 may be an electric power tool in any other forms including an impact driver.

As shown in FIG. 1 and FIG. 2, the electric power tool 1 includes a main body 2. The main body 2 includes a housing 3. The housing 3 is divided into left and right. Specifically, the housing 3 includes a first half housing 3a and a second half housing 3b. The first half housing 3a and the second half housing 3b are combined to form the housing 3.

The main body 2 includes a first casing 5. The first casing 5 contains a motor 11 (see FIG. 3) and a driving mechanism 12 (see FIG. 3). The first casing 5 further includes a direction setting switch 9 and a chuck sleeve 10.

The chuck sleeve 10 is selectively and removably attached to various tip tools (or tools). Each of the various tip tools may have any function. The various tip tools may include, for example, a Phillips-head driver bit 10a shown in FIG. 1. The tip tool is driven (e.g. rotated) by a rotational force of the motor 11.

The motor 11 is, in this first embodiment, in the form of a brushless motor (or a brushless DC motor). In other embodiments, the motor 11 may be a motor in any other forms including a brushed DC motor and an AC motor. The rotational driving force (or rotational force) generated by the motor 11 is transmitted to the driving mechanism 12. As shown in FIG. 3, the motor 11 includes a rotor 19. The rotor 19 of this first embodiment is in the form of a permanent magnet typed rotor. The rotation of the motor 11 specifically means a rotation of the rotor 19. The driving mechanism 12 includes, for example, a deceleration mechanism (not shown). The deceleration mechanism transmits the rotational driving force of the motor 11 to the chuck sleeve 10. The deceleration mechanism reduces the rotational speed of the chuck sleeve 10 so as to be lower than the rotational speed of the motor 11.

The direction setting switch 9 sets (or specifies) a rotation direction of the motor 11 (i.e. a rotation direction of the chuck sleeve 10). A user of the electric power tool 1 may operate the direction setting switch 9 to alternatively select a first direction (e.g. a forward rotation or a clock wise (CW) rotation) or a second direction (e.g. reverse rotation or a counter-clock wise (CCW) rotation). The direction setting switch 9 outputs a direction setting signal. The direction setting signal shows a rotation direction selected by the direction setting switch 9.

The direction setting switch 9 may be moved to a first position or a second position by user's hand (or manual operation), for example. In response to the direction setting switch 9 being moved to the first position, the rotation direction of motor 11 may be set to the first direction. In response to the direction setting switch 9 being moved to the second position, the rotation direction of motor 11 may be set to the second direction. The respective rotation directions of the motor 11 corresponding to the first position and the second position may be fixed beforehand. In each of the first position and the second position, a certain operating condition may be set. The operating condition may at least include, for example, the rotation direction of the motor 11. The operating condition may further include a desired rotational speed (or a target rotational speed) of the motor 11 (i.e. a desired rotational speed of the chuck sleeve 10) and/or a stop requirement of the motor 11. In this case, the motor 11 may be driven according to the operating condition corresponding to the position of the direction setting switch 9.

The main body 2 includes a grip 6. The grip 6 extends from the first casing 5. The grip 6 is gripped by the user, for example. The grip 6 has a trigger switch 8 provided thereto. The user can manually move (e.g. pull) the trigger switch 8 while holding the grip 6. In this first embodiment, pulling the trigger switch 8 corresponds to (i) move the trigger switch 8 in a left direction in FIG. 3 or (ii) push the trigger switch 8 into the main body 2.

The trigger switch 8 is manually turned on. The trigger switch 8 is turned off while not manually operated. The trigger switch 8 outputs a trigger detection signal. The trigger detection signal indicates whether the trigger switch 8 is turned off. The trigger detection signal may further indicate a position (or a length of movement, or a distance of movement, or an operation amount) of the trigger switch 8.

The main body 2 includes a second casing 7. The second casing 7 extends from the grip 6. The bottom of the second casing 7 is removably attached to a battery pack 100. As shown in FIG. 3, the second casing 7 contains a controller 30.

As shown in FIG. 3, the first casing 5 includes a torque sensor 13. The torque sensor 13 detects a load torque of the motor 11. The load torque is directly or indirectly applied to the motor 11. When various work is carried out by the tip tool attached to the chuck sleeve 10, the motor 11 receives the load torque through the tip tool, the chuck sleeve 10 and the driving mechanism 12 from the work target. The torque sensor 13 outputs a signal (hereinafter, also referred to as "torque detection signal") in accordance with this load torque. Detecting the load torque includes, more specifically in this first embodiment, detecting a magnitude of the load torque. Thus, the torque detection signal shows the magnitude of the load torque in this first embodiment.

The torque sensor 13 may be arranged at any position where the load torque is detectable. The torque sensor 13 may be provided, for example, to the chuck sleeve 10 or the driving mechanism 12. In this first embodiment, the torque sensor 13 is provided, for example, to the driving mechanism 12. The torque sensor 13 may generate the torque detection signal in any way (e.g. on any principle). The torque detection signal may be in any form. The torque sensor 13 of this first embodiment generates, for example, an analog voltage corresponding to an amount of mechanical torsion of a shaft (not shown). The torque detection signal includes this analog voltage. The shaft transmits a rotation of the motor 11 to the chuck sleeve 10.

The torque sensor 13 of this first embodiment outputs the torque detection signal corresponding to an actual load torque (i.e. corresponding to the actual amount of torsion of the shaft) in real time (i.e. continuously). Thus, the torque detection signal output from the torque sensor 13 at a certain point in time indicates the actual load torque at the point in time (or at an approximate point in time).

2-1-2. Electrical Configuration of Electric Power Tool

Figure 4:
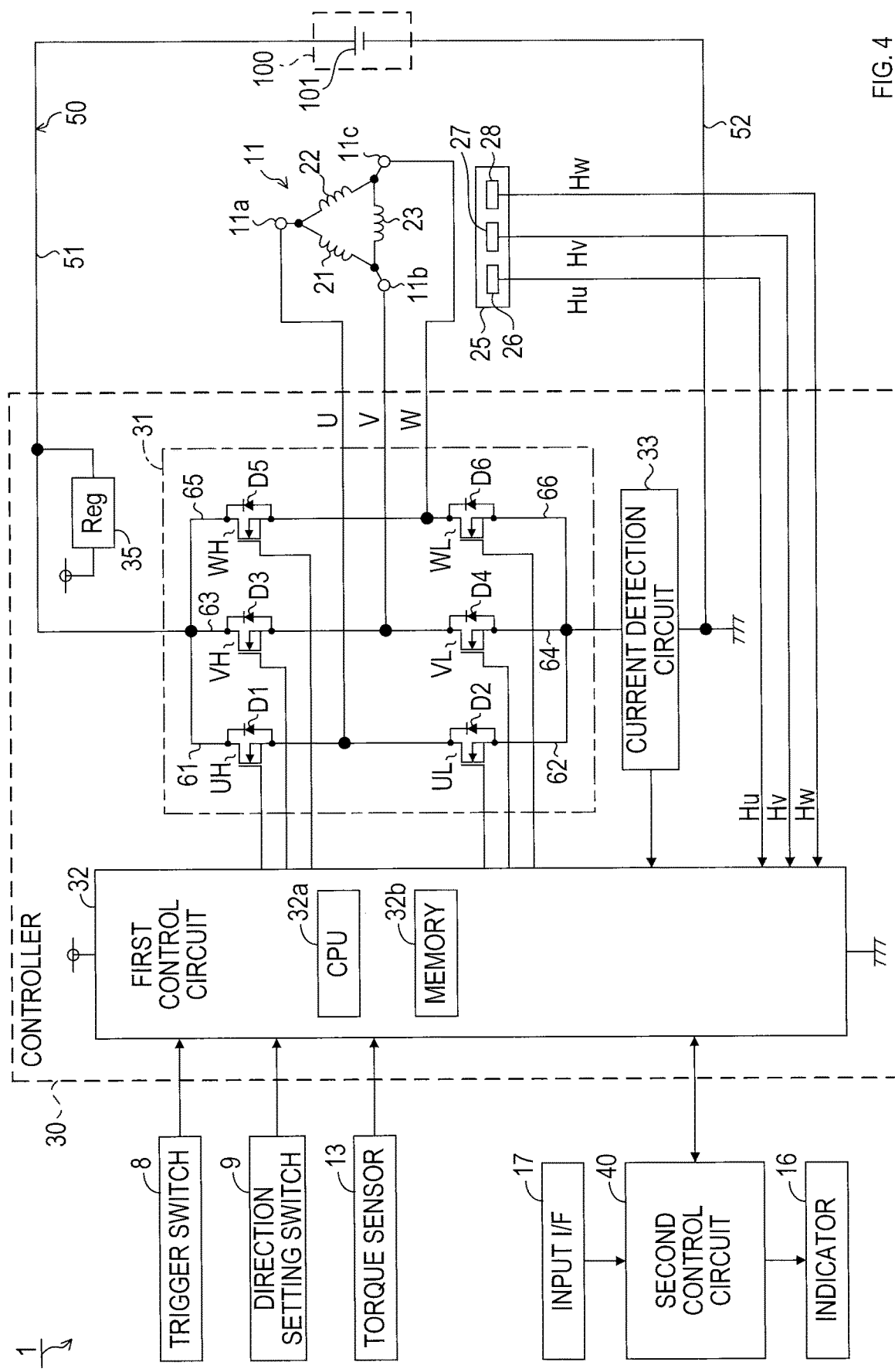
FIG. 4 is an explanatory diagram showing an electrical configuration of the electric power tool of the first embodiment.

The electrical configuration of the electric power tool 1 will be described in a supplemental manner with reference to FIG. 4. FIG. 4 shows the electric power tool 1 with the battery pack 100 attached to the main body 2.

The battery pack 100 includes the battery 101. The battery 101 may be a rechargeable battery, for example. The battery 101 may be a lithium ion battery, for example. The battery 101 may be a rechargeable battery different from the lithium ion battery.

The electric power tool 1 includes the motor 11, the trigger switch 8, the direction setting switch 9 and the torque sensor 13. The electric power tool 1 further includes a display 16 and an input I/F 17. Here, the term "I/F" is an abbreviation of an interface.

The motor 11 is driven by the battery power. The motor 11 receives the battery power from the battery 101 through a motor driver 31 described below. The motor driver 31 converts the battery power into three-phase power. The motor 11 receives the three-phase power.

The motor 11 includes a first winding 21, a second winding 22, and a third winding 23. In this first embodiment, the first through third windings 21-23 are connected, for example, in a delta connection. However, the first through third windings 21-23 may be connected in a manner other than the delta connection. The motor 11 includes a first terminal 11a, a second terminal 11b, and a third terminal 11c. The first through third terminals 11a-11c receive the three-phase power. The three-phase power is delivered from the first through third terminals 11a-11c to the first through third windings 21-23.

Furthermore, the electric power tool 1 includes a rotation signal output circuit (or a rotational-position detector) 25. The rotation signal output circuit 25 outputs a rotational position information. The rotational position information may indicate whether the motor 11 rotates. The rotational position information may vary in accordance with a rotational position and/or a rotational speed of the motor 11. The rotational position information may indicate a rotational position of the motor 11, more specifically, a rotational position of the rotor 19. The rotational position information of this first embodiment includes a first position signal Hu, a second position signal Hv, and a third position signal Hw. The rotational position information is input into a first control circuit 32 described below.

The rotation signal output circuit 25 of this first embodiment includes three Hall sensors. That is, the rotation signal output circuit 25 includes a first Hall sensor 26, a second Hall sensor 27, and a third Hall sensor 28. The first through third Hall sensors 26-28 are arranged around the rotor 19. Specifically, the first through third Hall sensors 26-28 are arranged around a rotation axis of the rotor 19 along a rotation direction of the rotor 19, spaced from each other at an angle corresponding to an electrical angle of 120 degrees.

The first Hall sensor 26 outputs the first position signal Hu. The first position signal Hu varies in accordance with the position of the first Hall sensor 26 relative to the rotor 19. The second Hall sensor 27 outputs the second position signal Hv. The second position signal Hv varies in accordance with the position of the second Hall sensor 26 relative to the rotor 19. The third Hall sensor 28 outputs the third position signal Hw. The third position signal Hw varies in accordance with the position of the third Hall sensor 28 relative to the rotor 19. Each of the first through third position signals Hu, Hv, Hw is in the form of a binary signal (i.e. digital signal) in this first embodiment.

The electric power tool 1 further includes a controller 30. The controller 30 is electrically connected to the battery pack 100 attached to the main body 2 through a power supply path 50. The controller 30 receives the battery power from battery 101 through the power supply path 50. The power supply path 50 includes a positive electrode path 51 and a negative electrode path 52. The controller 30 includes a motor driver 31. The positive electrode path 51 leads to the motor driver 31 from a positive electrode of the battery 101. The negative electrode path 52 leads to the motor driver 31 from a negative electrode of the battery 101. The power supply path 50 further includes a first path 61, a second path 62, a third path 63, a fourth path 64, a fifth path 65, and a sixth path 66, which will be described below. The first through sixth paths 61-66 are provided to the motor driver 31.

The motor driver 31 is connected to the first through third terminals 11a-11c. The motor driver 31 receives the battery power from the battery 101. The motor driver 31 generates the above-mentioned three-phase power from the battery power and supplies it to the motor 11. The motor 11 is driven by the three-phase power.

The motor driver 31 of this first embodiment is in the form of a 3-phase full-bridge circuit. That is, the motor driver 31 includes a first switch UH, a second switch UL, a third switch VH, a fourth switch VL, a fifth switch WH, and a sixth switch WL. Each of the first through sixth switches UH, UL, VH, VL, WH, WL may be in any form. In this first embodiment, each of the first through sixth switches UH, UL, VH, VL, WH, WL is in the form of, for example, N-Channel metal oxide semiconductor field effect transistor (MOSFET).

The motor driver 31 incudes the above-mentioned first through sixth paths 61-66. The first path 61 electrically connects the first terminal 11a to the positive electrode path 51 (i.e. to the positive electrode of the battery 101). A path from the first terminal 11a to the positive electrode of the battery 101 may be considered as the first path 61. The second path 62 electrically connects the first terminal 11a to the negative electrode path 52 (i.e. to the negative electrode of the battery 101). A path from the first terminal 11a to the negative electrode of the battery 101 may be considered as the second path 62. The third path 63 electrically connects the second terminal 11b to the positive electrode path 51 (i.e. to the positive electrode of the battery 101). A path from the second terminal 11b to the positive electrode of the battery 101 may be considered as the third path 63. The fourth path 64 electrically connects the second terminal 11b to the negative electrode path 52 (i.e. to the negative electrode of the battery 101). A path from the second terminal 11b to the negative electrode of the battery 101 may be considered as the fourth path 64. The fifth path 65 electrically connects the third terminal 11c to the positive electrode path 51 (i.e. to the positive electrode of the battery 101). A path from the third terminal 11c to the positive electrode of the battery 101 may be considered as the fifth path 65. The sixth path 66 electrically connects the third terminal 11c to the negative electrode path 52 (i.e. to the negative electrode of the battery 101). A path from the third terminal 11c to the negative electrode of the battery 101 may be considered as the sixth path 66.

The first switch UH is on the first path 61. The first switch UH is turned on (i.e. switched to an ON-state) when receiving a first drive signal from the first control circuit 32. The first switch UH is turned off (i.e. switched to an OFF-state) when not receiving the first drive signal. The first path 61 is completed through the first switch UH when the first switch UH is turned on. The first path 61 is interrupted by the first switch UH when the first switch UH is turned off.

The second switch UL is on the second path 62. The second switch UL is turned on when receiving a second drive signal from the first control circuit 32. The second switch UL is turned off when not receiving the second drive signal. The second path 62 is completed through the second switch UL when the second switch UL is turned on. The second path 62 is interrupted by the second switch UL when the second switch UL is turned off.

The third switch VH is on the third path 63. The third switch VH is turned on when receiving a third drive signal from the first control circuit 32. The third switch VH is turned off when not receiving the third drive signal. The third path 63 is completed through the third switch VH when the third switch VH is turned on. The third path 63 is interrupted by the third switch VH when the third switch VH is turned off.

The fourth switch VL is on the fourth path 64. The fourth switch VL is turned on when receiving a fourth drive signal from the first control circuit 32. The fourth switch VL is turned off when not receiving the fourth drive signal. The fourth path 64 is completed through the fourth switch VL when the fourth switch VL is turned on. The fourth path 64 is interrupted by the fourth switch VL when the fourth switch VL is turned off.

The fifth switch WH is on the fifth path 65. The fifth switch WH is turned on when receiving a fifth drive signal from the first control circuit 32. The fifth switch WH is turned off when not receiving the fifth drive signal. The fifth path 65 is completed through the fifth switch WL when the fifth switch WH is turned on. The fifth path 65 is interrupted by the fifth switch WH when the fifth switch WH is turned off.

The sixth switch WL is on the sixth path 66. The sixth switch WL is turned on when receiving a sixth drive signal from the first control circuit 32. The sixth switch WL is turned off when not receiving the sixth drive signal. The sixth path 66 is completed through the sixth switch WL when the sixth switch WL is turned on. The sixth path 66 is interrupted by the sixth switch WL when the sixth switch WL is turned off.

The motor driver 31 further includes, a first diode D1, a second diode D2, a third diode D3, a fourth diode D4, a fifth diode D5, and a sixth diode D6.

The first diode D1 is connected to the first path 61 so as to bypass the first switch UH. More specifically, the first diode D1 includes an anode connected to a source of the first switch UH and a cathode connected to a drain of the first switch UH. The first diode D1 may be in the form of a parasitic diode included in the first switch UH.

The second diode D2 is connected to the second path 62 so as to bypass the second switch UL. More specifically, the second diode D2 includes an anode connected to a source of the second switch UL and a cathode connected to a drain of the second switch UL. The second diode D2 may be in the form of a parasitic diode included in the second switch UL.

The third diode D3 is connected to the third path 63 so as to bypass the third switch VH. More specifically, the third diode D3 includes an anode connected to a source of the third switch VH and a cathode connected to a drain of the third switch VH. The third diode D3 may be in the form of a parasitic diode included in the third switch VH.

The fourth diode D4 is connected to the fourth path 64 so as to bypass the fourth switch VL. More specifically, the fourth diode D4 includes an anode connected to a source of the fourth switch VL and a cathode connected to a drain of the fourth switch VL. The fourth diode D4 may be in the form of a parasitic diode included in the fourth switch VL.

The fifth diode D5 is connected to the fifth path 65 so as to bypass the fifth switch WH. More specifically, the fifth diode D5 includes an anode connected to a source of the fifth switch WH and a cathode connected to a drain of the fifth switch WH. The fifth diode D5 may be in the form of a parasitic diode included in the fifth switch WH.

The sixth diode D6 is connected to the sixth path 66 so as to bypass the sixth switch WL. More specifically, the sixth diode D6 includes an anode connected to a source of the sixth switch WL and a cathode connected to a drain of the sixth switch WL. The sixth diode D6 may be in the form of a parasitic diode included in the sixth switch WL.

The motor driver 31 can be divided, for example, into three systems. The three systems include, for example, a U-PHASE system, a V-PHASE system and a W-PHASE system. The U-PHASE system includes the first and second switches UH, UL and the first and second paths 61, 62. The V-PHASE system includes the third and fourth switches VH, VL and the third and fourth paths 63, 64. The W-PHASE system includes the fifth and sixth switches WH, WL and the fifth and sixth paths 65, 66.

The controller 30 includes a current detection circuit (or current detector) 33. The current detection circuit 33 detects a value (hereinafter, also referred to as "motor current value") of a current (hereinafter, also referred to as "motor current") supplied from the battery 101 to the motor 11. The current detection circuit 33 of this first embodiment is provided, for example, to the negative electrode path 52. In response to the electric power being supplied from the battery 101 to the motor 11, the motor current flows through the negative electrode path 52. The motor current value corresponds to a value of a motor current flowing through the negative electrode path 52. The current detection circuit 33 outputs a signal (hereinafter, also referred to as "current detection signal") corresponding to a magnitude of the current flowing through the negative electrode path 52. The current detection signal is input into the first control circuit 32.

The controller 30 includes the first control circuit 32. The first control circuit 32 of this first embodiment is in the form of a microcomputer or a micro control unit (MCU) including a CPU 32a and a memory 32b. The memory 32b may include, for example, a semiconductor memory such as a ROM, a RAM, an NVRAM, and a flash memory.

The first control circuit 32 realizes various functions by executing a program stored in a non-transitory tangible storage medium. In this first embodiment, a memory 32b corresponds to the non-transitory tangible storage medium storing the program. In this first embodiment, the memory 32b stores a program of a motor control process (see FIG. 12) described below.

A part or all of the various functions implemented by the first control circuit 32 may be accomplished by program execution (i.e. by software process) and may be accomplished by one or more hardware. For example, in place of or in addition to the microcomputer, the first control circuit 32 may be provided with a logic circuit including multiple electronic components. The first control circuit 32 may include, for example, Application Specific Integrated Circuit (ASIC) and/or Application Specific Standard Product (ASSP). The first control circuit 32 may include a programmable logic device that can build an arbitrary logic circuit, e.g. a field programmable gate array (FPGA). Alternatively, the first control circuit 32 may be in the form of a hard wired circuit.

The first control circuit 32 receives the rotational position information (i.e., the first through third position signals Hu, Hv, Hw) from the rotation signal output circuit 25. The first control circuit 32 detects a rotational speed of motor 11 every time a level of any one of the first through third position signals Hu, Hv, Hw varies (i.e. every time the rotor 19 rotates by an angle corresponding to 60 electrical degrees). Specifically, the first control circuit 32 detects the rotational speed based on a period of time from a timing of a level change in the past (e.g. at the last time) to a timing of a level vary at this time.

More specifically, in this first embodiment, every time a level of any one of the first through third position signals Hu, Hv, Hw varies, a process of the CPU32a is interrupted (hereinafter, also referred to as "Hall sensor interruption"). Upon receipt of the Hall sensor interruption, the CPU 32a calculates the rotational speed of the motor 11. Until a next Hall sensor interruption enters again, the CPU 32a recognizes the calculated rotational speed as a current rotational speed of the motor 11. Hereinafter, a term of "recognized rotational speed" means a rotational speed calculated upon receipt of the Hall sensor interruption. That is, in this first embodiment, the recognized rotational speed is updated every time the CPU 32*a* receives a Hall sensor interruption (i.e. every time the rotor 19 rotates by the angle corresponding to 60 electrical degrees).

The first control circuit 32 receives the trigger detection signal from a trigger switch 8. The first control circuit 32 can detect, based on the trigger detection signal, whether the trigger switch 8 is turned on.

The first control circuit 32 receives a direction setting signal from the direction setting switch 9. The first control circuit 32 can detect which direction is selected, the first direction or the second direction, based on the direction setting signal.

The first control circuit 32 receives the torque detection signal from a torque sensor 13. The first control circuit 32 can detect the load torque based on the torque detection signal. As described above, the torque sensor 13 continuously outputs the torque detection signal that reflects an actual load torque in real time. Thus, the first control circuit 32 can detect the actual load torque in real time.

The controller 30 includes a power supply circuit 35. The power supply circuit 35 receives the battery power from the battery 101. The power supply circuit 35 generates power-supply power from the battery power and outputs it. The power-supply power has a control voltage Vc. The control voltage Vc has, for example, a given voltage value (or a fixed voltage value). The power-supply power is supplied to respective sections in the controller 30, including the first control circuit 32. The first control circuit 32 operates by the power-supply power. In this first embodiment, the power-supply power is also supplied to the rotation signal output circuit 25. The rotation signal output circuit 25 receives the power-supply power and generates the first through third position signals Hu, Hv, Hw.

The electric power tool 1 further includes a second control circuit 40. The second control circuit 40 is connected to an input I/F 17 and an indicator 16. The input I/F 17 includes one or more switches operated by the user. The input I/F 17 of this first embodiment includes, for example, four switches. The indicator 16 can display various images and/or texts.

The second control circuit 40 determines a drive setting and transmits the drive setting to the first control circuit 32. The drive setting is used to drive the motor 11. The drive setting includes various setting items. For example, various setting items include a desired rotational speed of the motor 11 and a fastening completion requirement. In this first embodiment a constant rotation control is performed as described below. In the constant rotation control, the motor 11 is controlled so that the actual rotational speed (or the recognized rotational speed) of the motor 11 corresponds to the desired rotational speed.

The fastening completion requirement is required to stop the rotating motor 11. More specifically, the fastening completion requirement is required to shift from the constant rotation control to a stop control. The stop control is executed to stop the rotation of the motor 11. In response to the stop control being performed by the first control circuit 32, the rotation of the motor 11 is stopped.

In this first embodiment, in response to the trigger switch 8 being turned on, the motor 11 starts to rotate. In response to the stop requirement being satisfied during the rotation of the motor 11, a brake preparation process is started. The stop requirement is satisfied, for example, in response to the trigger switch 8 being turned off, or the above-mentioned fastening completion requirement being satisfied in this first embodiment. Thus, when the fastening completion requirement is satisfied during the rotation of the motor 11, the stop requirement is satisfied even if the trigger switch 8 is turned on. The stop requirement is satisfied, for example, in response to the trigger switch 8 being turned off, or the above-mentioned fastening completion requirement being satisfied in this first embodiment.

The fastening completion requirement may be determine in any manner. In this first embodiment, the fastening completion requirement includes, for example, desired torque (or target torque), drive time and/or a fastening rotation angle. If the fastening completion requirement includes, for example, the desired torque, the fastening completion requirement is satisfied in response to the load torque reaching the desired torque after the motor 11 starts rotating. If the fastening completion requirement includes, for example, the drive time, the fastening completion requirement is satisfied when the drive time passes after the motor 11 starts rotating. If the fastening completion requirement includes, for example, the desired torque and the drive time, the fastening completion requirement is satisfied when the load torque reaches the desired torque, or the drive time passes after the motor 11 starts rotating.

The user can individually or collectively select the setting items through the input I/F 17. In response to the setting items selected by the user being determined as the drive setting, the second control circuit 40 notifies the first control circuit 32 of the determined drive setting.

For example, the user may be able to select a desired rotational speed from first through Nth desired rotational speeds. "N" is natural number of equal to or more than two. Each of the first through Nth desired rotational speeds may be, for example, within a range from 20000 rpm to 1000 rpm inclusive. One or more of the first through Nth desired rotational speeds may be equal to or less than a threshold speed. The threshold speed may be, for example, 5000 rpm.

The second control circuit 40 of this first embodiment displays, for example, N types of options of the drive setting in the indicator 16. The N types of options respectively include the above-described first through Nth desired rotational speeds. The user can select one of the options through the input I/F 17. In response to an option being selected by the user, the second control circuit 40 determines the selected option as the drive setting and notifies the first control circuit 32 of the drive setting. In this first embodiment, one specific option is set as a default option. Upon activation, the second control circuit 40 executes an initial process. The initial process includes determining the default option as the drive setting, and notifying the first control circuit 32.

2-1-3. Constant Rotation Control

In response to the trigger switch 8 being turned on, the first control circuit 32 executes the constant rotation control. This makes the motor 11 rotate in the rotation direction set by the direction setting switch 9.

Specifically, the first control circuit 32 obtains the above-described drive setting from the second control circuit 40. The drive setting includes the desired rotational speed. The first control circuit 32 controls the battery power (specifically, the three-phase power) to the motor 11 so that the rotational speed of the motor 11 corresponds to the desired rotational speed obtained.

The constant rotation control of this first embodiment includes a velocity feedback control. Hereinafter, "feedback" is also referred to as "FB". In the velocity FB control in this first embodiment, proportional-integral control is used, for example.

In the velocity FB control, a drive command value is calculated so that the rotational speed of the motor 11 corresponds to the desired rotational speed. The drive command value shows the magnitude of electric power that should be supplied to the motor 11. The drive command value of this first embodiment includes a duty ratio. Hereinafter, this duty ratio is referred to as "drive duty ratio". In the velocity FB control, a drive duty ratio is calculated in accordance with a difference between the recognized rotational speed and the desired rotational speed (hereinafter, also referred to as "speed difference"). For example, the drive duty ratio may be calculated so that the drive duty ratio increases according to an increase in the speed difference.

In the constant rotation control, the first control circuit 32 calculates a drive duty ratio in each specified control cycle and drives the motor driver 31 based on the drive duty ratio. The first control circuit 32 drives the motor driver 31 by a low-side-PWM process and/or a high-side-PWM process.

In the low-side-PWM process, any one of three high-side switches is held (or maintained) in the ON-state. In the low-side-PWM process, furthermore, any one of the low-side switches in a system different from the system containing the high-side switch held in the ON-state (hereinafter, also referred to as "ON-held HSS") is PWM driven. The low-side switch that is PWM driven in the low-side-PWM process is also referred to as "PWM-driven LSS".

The "high-side switch" corresponds to each of the first, third, and fifth switches UH, VH, WH. That is, "three high-side switches" corresponds to the first, third, and fifth switches UH, VH, WH. The "low-side switch" corresponds to each of the second, fourth, and sixth switches UL, VL, WL. That is, the "three low-side switches" corresponds to the second, fourth, and sixth switches UL, VL, WL.

The PWM drive (i.e. being PWM driven) means periodically turning on and off a switch targeted for the PWM drive (hereinafter, also referred to as "PWM-driven switch") in accordance with a pulse width modulated signal. The pulse width modulated signal includes the above-mentioned drive duty ratio. That is, the PWM drive means to drive the PWM-driven switch by the pulse width modulated signal.

In the high-side-PWM process, any one of the three low-side switches is held in the ON-state. In the high-side-PWM process, furthermore, any one of high-side switches in a system different from the system containing the low-side switch held in the ON-state (hereinafter, also referred to as "ON-held LSS") is set as the PWM-driven switch and is PWM driven. The high-side switch that is PWM driven in the high-side-PWM process is also referred to as "PWM-driven HSS".

In the case of functionalizing the first switch UH as the ON-held HSS, the first control circuit 32 outputs the first drive signal to the first switch UH to hold the first switch UH in the ON-state. In the case of functionalizing the first switch UH as the PWM-driven HSS, the first control circuit 32 sets the above-mentioned pulse width modulated signal to the first drive signal and outputs the first drive signal to the first switch UH. The same can be applied to a case of functionalizing each of the third and fifth switches VH, WH as the ON-held HSS or the PWM-driven HSS.

In the case of functionalizing the second switch UL as the ON-held LSS, the first control circuit 32 outputs the second drive signal to hold the second switch UL in the ON-state to the second switch UL. In the case of functionalizing the second switch UL as the PWM-driven LSS, the first control circuit 32 sets the above-mentioned pulse width modulated signal as the second drive signal and outputs the second drive signal to the second switch UL. The same can be applied to a case of functionalizing each of the fourth and sixth switches VL, WL as the ON-held LSS or the PWM-driven LSS.

In a case where the first control circuit 32 is configured to perform the low-side-PWM process, the first control circuit 32 rotates the motor 11 while appropriately switching the combination of the ON-held HSS and the PWM-driven LSS in accordance with a rotational position (i.e. rotation angle) of the motor 11.

In a case where the first control circuit 32 is configured to perform the high-side-PWM process, the first control circuit 32 rotates the motor 11 while appropriately switching the combination of the ON-held LSS and the PWM-driven HSS in accordance with the rotational position of the motor 11.

The first control circuit 32 may be configured to execute the low-side-PWM process and not execute the high-side-PWM process. The first control circuit 32 may be configured to execute the high-side-PWM process and not execute the low-side-PWM process. The first control circuit 32 may be configured to execute the high-side-PWM process and the low-side-PWM process. Specifically, the first control circuit 32 may rotate the motor 11 while appropriately switching the low-side-PWM process and the high-side-PWM process.

Figure 5:
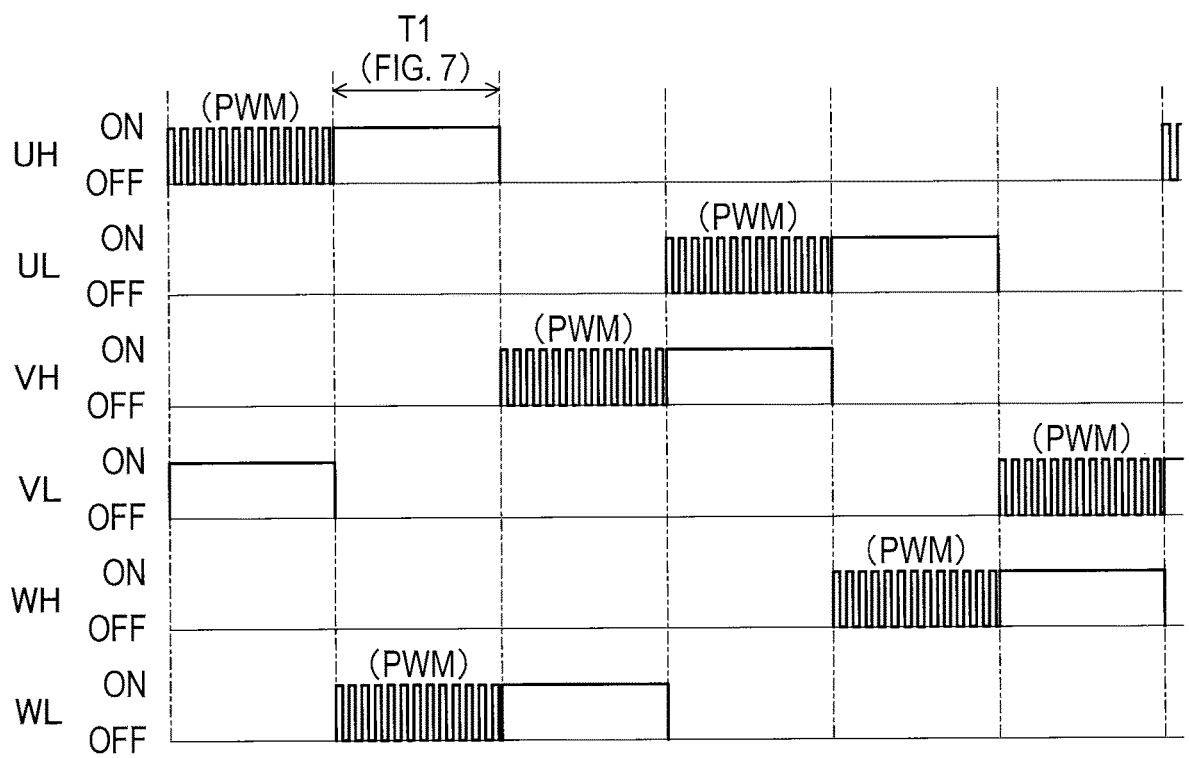
FIG. 5 is a timing chart showing a first drive pattern of the first embodiment.
Figure 6:
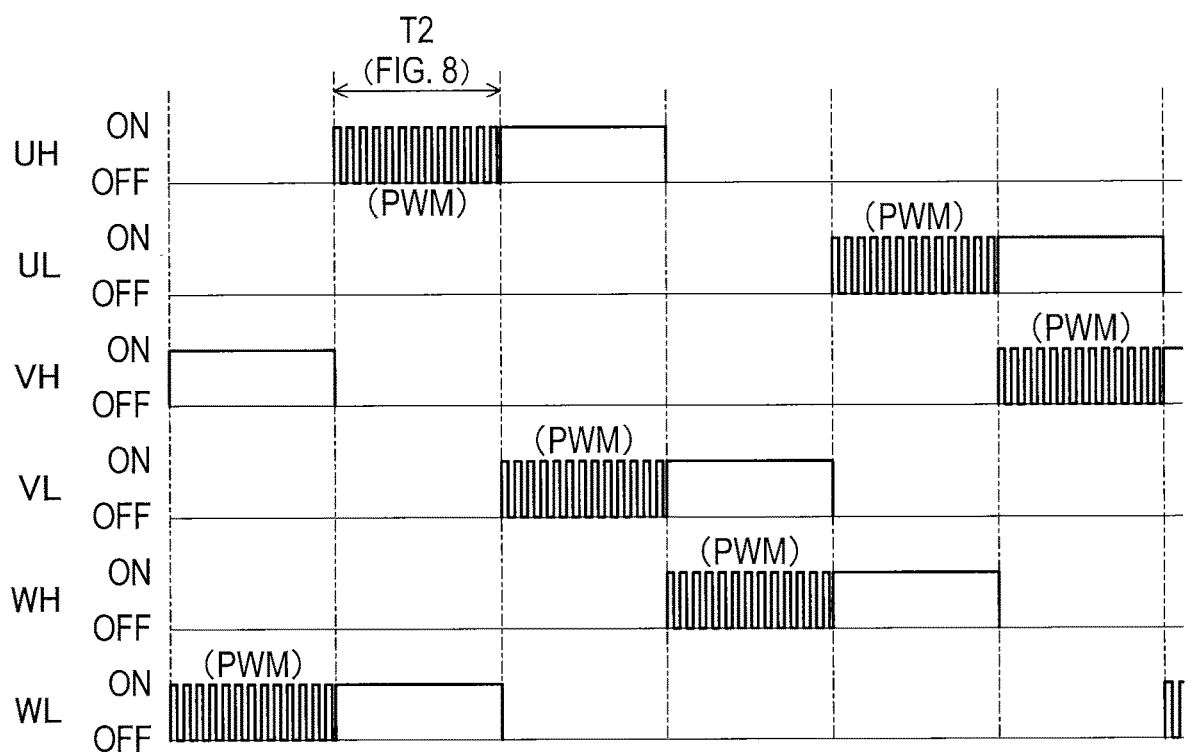
FIG. 6 is a timing chart showing a second drive pattern of the first embodiment.

In this first embodiment, for example, the first through sixth switches UH-WL are driven in accordance with a first drive pattern exemplified in FIG. 5 or a second drive pattern exemplified in FIG. 6. In FIG. 5 and FIG. 6, "(PWM)" means that the switch is PWM driven. The horizontal axes in FIG. 5 and FIG. 6 show the rotation angle of rotor 19.

Figure 7:
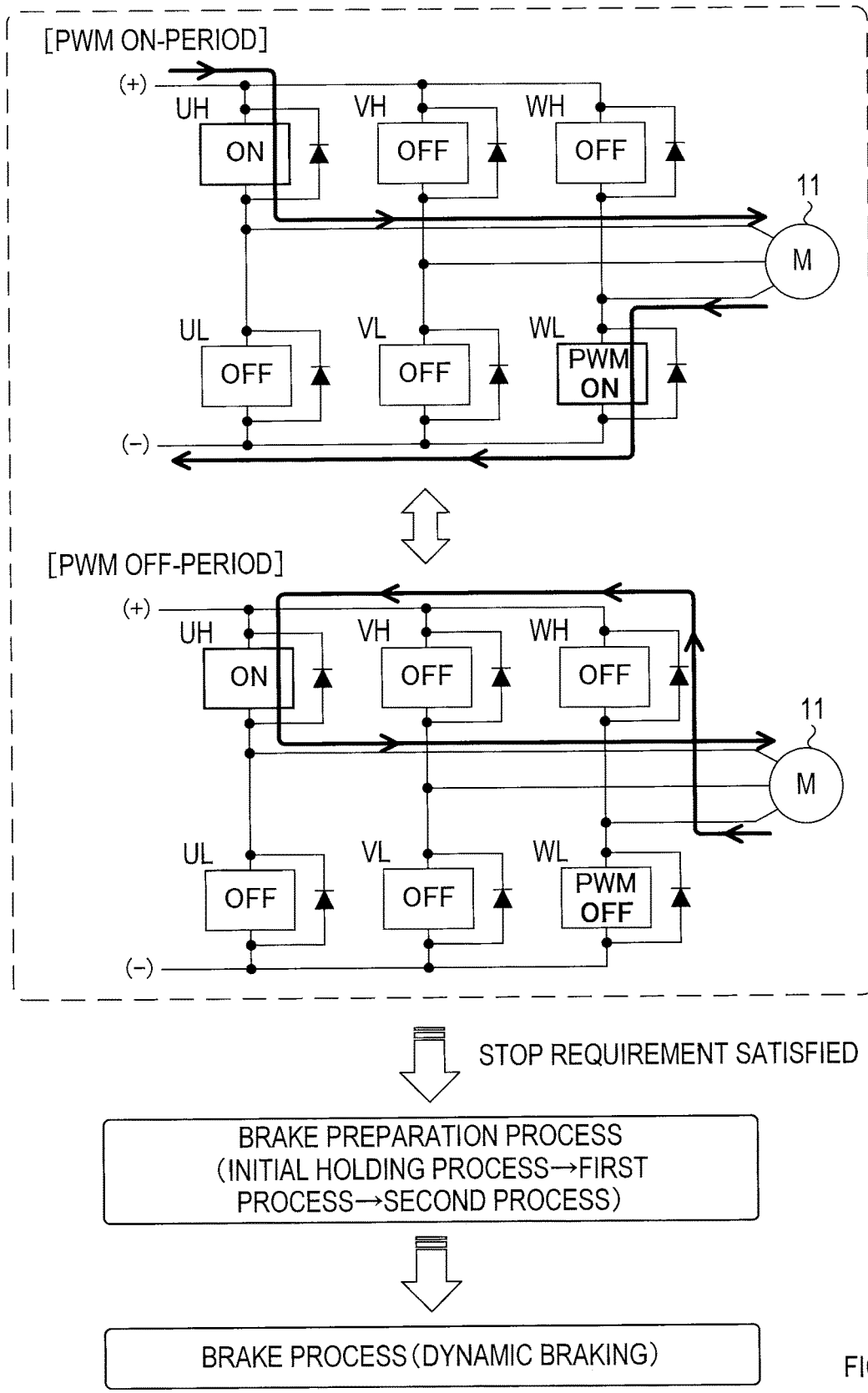
FIG. 7 shows an operation example of a low-side-PWM process of the first embodiment.

In FIG. 5, the low-side-PWM process is performed, for example, during a time period T1. Specifically, the first switch UH is set to the ON-held HSS, and held in the ON-state. Furthermore, the sixth switch WL is set to the PWM-driven LSS and is PWM driven. FIG. 7 schematically shows a path of a current flowing in the motor 11 during this time period T1.

Figure 8:
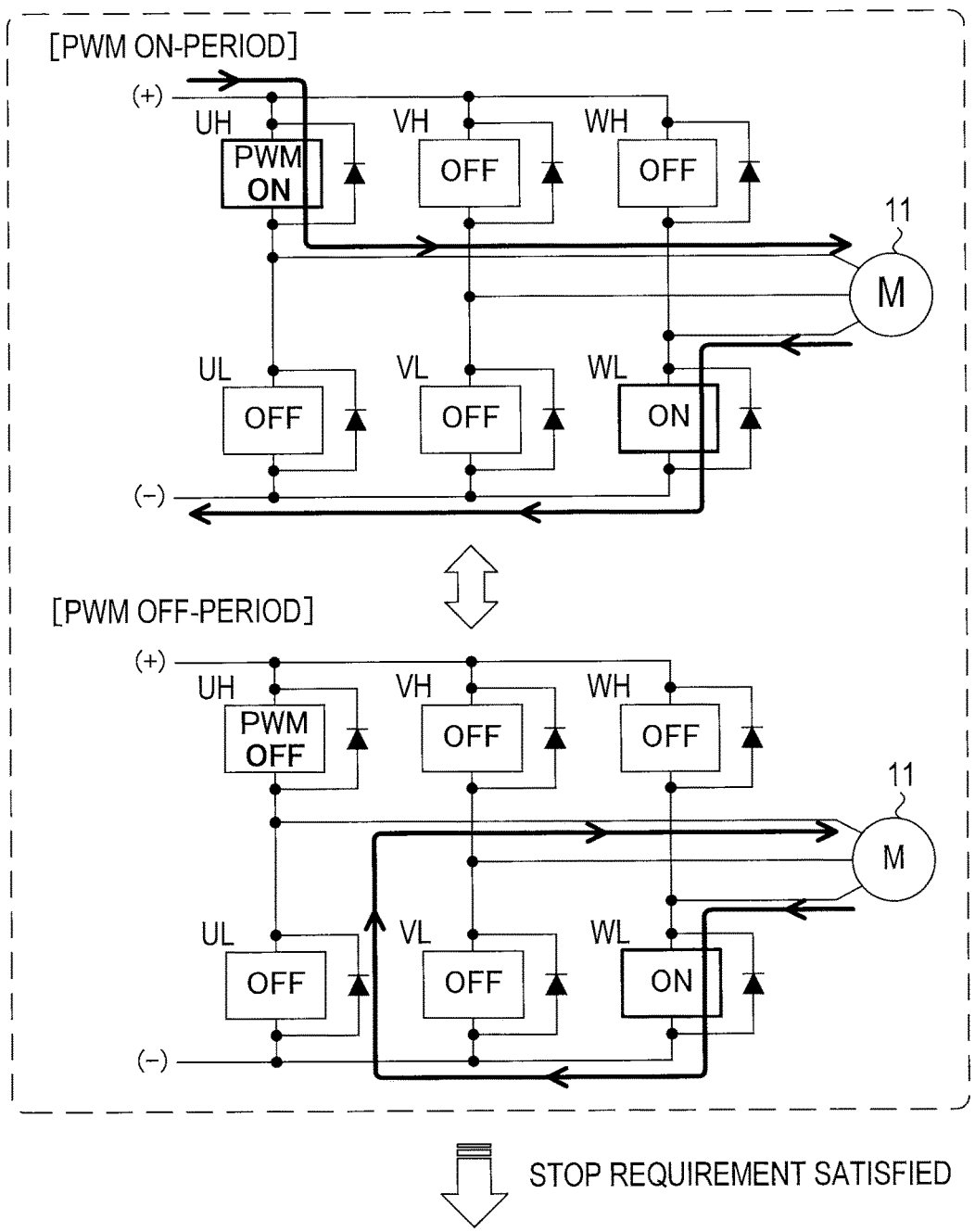
FIG. 8 shows an operation example of a high-side-PWM process of the first embodiment.

In FIG. 7 and FIG. 8, the expression of "PWM on-period" corresponds to a time period when the PWM-driven switch is turned on by the pulse width modulated signal. The expression of "PWM off-period" corresponds to a time period when the PWM-driven switch is turned off. In FIG. 7 and FIG. 8, the expression of "ON" means that the switch is turned on, and the expression of "OFF" means that the switch is turned off. In FIG. 7 and FIG. 8, the expression of "PWM ON" means that the switch is switched to the ON-state in the PWM drive, and the expression of "PWM OFF" means that the switch is switched to the OFF-state in the PWM drive.

In an example shown in FIG. 7, the first and the sixth switches UH, WL are turned on during the PWM on-period. In this case, the motor current flows from the positive electrode of the battery 101 to the negative electrode of the battery 101 via the first switch UH, the first terminal 11a, the third terminal 11c and the sixth switch WL.

On the other hand, in the PWM off-period, the sixth switch WL is turned off. In this case, the battery power is not supplied to the motor 11. However, because of residual energy of the motor 11, a circulating current (or a flyback current) flows as shown in FIG. 7. In this case, a path of the circulating current runs from the third terminal 11c to the first terminal 11a via the fifth diode D5 and the first switch UH.

In FIG. 6, the high-side-PWM process is performed, for example, during a time period T2. Specifically, the sixth switch WL is set to the ON-held LSS, and held in the ON-state. Furthermore, the first switch UH is set to the PWM-driven HSS and is PWM driven. FIG. 8 schematically shows a path of a current flowing in the motor 11 during this time period T2.

In an example shown in FIG. 8, the first and the sixth switches UH, WL are turned on during the PWM on-period. In this case, the motor current flows from the positive electrode of the battery 101 to the negative electrode of the battery 101 via the first switch UH, the first terminal 11a, the third terminal 11 and the sixth switch WL.

On the other hand, in the PWM off-period, the first switch UH is turned off. In this case, the battery power is not supplied to the motor 11. However, because of residual energy of the motor 11, a circulating current flows as shown in FIG. 8. In this case, a path of the circulating current runs from the third terminal 11c to the first terminal 11a via the sixth switch WL and the second diode D2.

In the low-side-PWM process and the high-side-PWM process of this first embodiment, a non-complementary drive is performed. In other words, a complementary drive is not performed. The complementary drive includes turning on an opposite side switch in the at least a part of the off-period of the PWM-driven switch. The opposite side switch corresponds to a switch different from the PWM-driven switch in the system including the PWM-driven switch. For example, in a case where the sixth switch WL is PWM driven, the fifth switch WH corresponds to the opposite side switch. In a case where the first switch UH is PWM driven, the second switch UL corresponds to the opposite side switch.

In a case where the complementary drive is performed, for example, the fifth switch WH is turned on in the at least a part of the off-period of the sixth switch WL during the time period T1 of FIG. 5. For example, during the time period T2 of FIG. 6, the second switch UL is turned on in the at least a part of the off-period of the first switch UH. In this first embodiment, such a complementary drive is not performed.

In response to the stop requirement being satisfied during the executions of both the low-side-PWM process and the high-side-PWM process, the constant rotation control is shifted to the stop control. The stop control includes the brake preparation process and the brake process. Specifically, as simply shown in FIG. 7 and FIG. 8, in a case where the stop requirement is satisfied, the brake preparation process is firstly performed, and then the brake process is performed.

2-1-4. Stop Control

Figure 9:
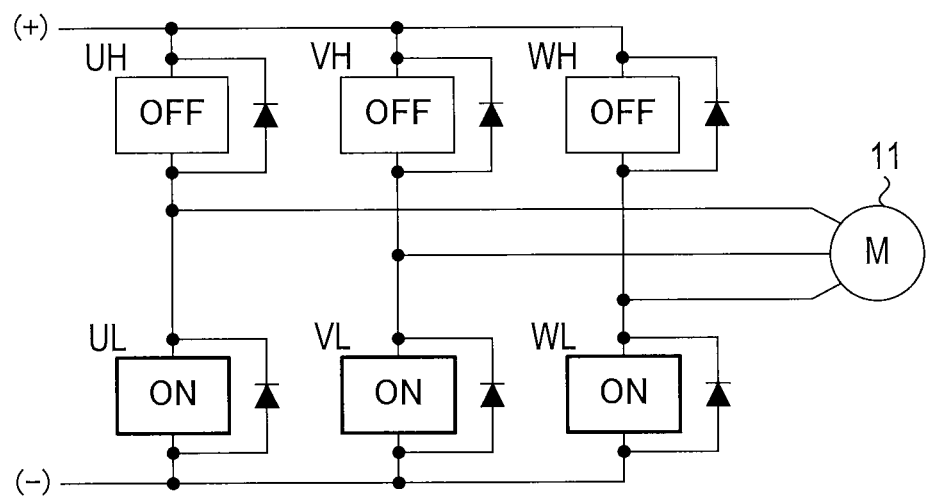
FIG. 9 shows an operation example of a brake process of the first embodiment.

The stop control will be described with reference to FIG. 9 and FIG. 10.

First of all, the brake process will be described with reference to FIG. 9. In the brake process, a dynamic braking is activated. In this first embodiment, a 3-phase dynamic braking is activated, for example. Specifically, as shown in FIG. 9, all the high-side switches UH, VH, WH are held in the OFF-state, and all the low-side switches UL, VL, WL are held in the ON-state. By such a brake process, the first through third terminals 11a-11c of the motor 11 are short-circuited each other. This makes the motor 11 stop and brake. That is, a stop state of the motor 11 is maintained.

If the brake process is performed immediately after the stop requirement is satisfied, the motor 11 can be stopped promptly. However, if the brake process is started during the execution of the constant rotation control, an arm-shorting may occur. The arm-shorting means a situation where the high-side switch and the low-side switch in the same system become in the ON-state at the same time. For example, if the brake process is started when the first switch UH is turned on by the low-side-PWM process, the second switch UL may be turned on before the first switch UH is turned off. In this case, the arm-shorting may occur in the U-PHASE system.

In order to prevent the arm-shorting, for example, in response to the stop requirement being satisfied, the first through sixth switches UH-WL could be once turned off before the brake process. However, if all the switches are turned off when the electric current is supplied to the motor 11, the electric power regeneration may occur from the motor 11 to the battery 101. The electric power regeneration occurs due to an inductance component of each of the first through third windings 21-23 of the motor 11. Upon the occurrence of the electric power regeneration, the voltage of the positive electrode path 51 becomes temporarily higher than the voltage of the battery 101, resulting in a possible failure in the controller 30.

The technique disclosed in the above-mentioned Japanese Patent No. 6884561 can inhibit such an electric power regeneration. However, as described above, this technique requires an extended period of time (e.g., more than several milliseconds) before the start of the brake process after the stop requirement is satisfied. Thus, it is difficult to promptly perform the brake process after the stop requirement is satisfied.

The stop control of this first embodiment makes it possible to promptly start the brake process while inhibiting the arm-shorting and the electric power regeneration. Specifically, in the stop control of this first embodiment, the brake preparation process is executed before the brake process.

The brake preparation process will be described with reference to FIG. 10. The brake preparation process of this first embodiment includes an initial holding process. The brake preparation process can further include a first process and a second process. Specifically, in response to the stop requirement being satisfied during the execution of the low-side-PWM process, the brake preparation process is performed in the order of the initial holding process, the first process, and the second process. On the other hand, in response to the stop requirement being satisfied during the execution of the high-side-PWM process, the initial holding process is performed, and the first process and the second process are not performed.

Figure 10:
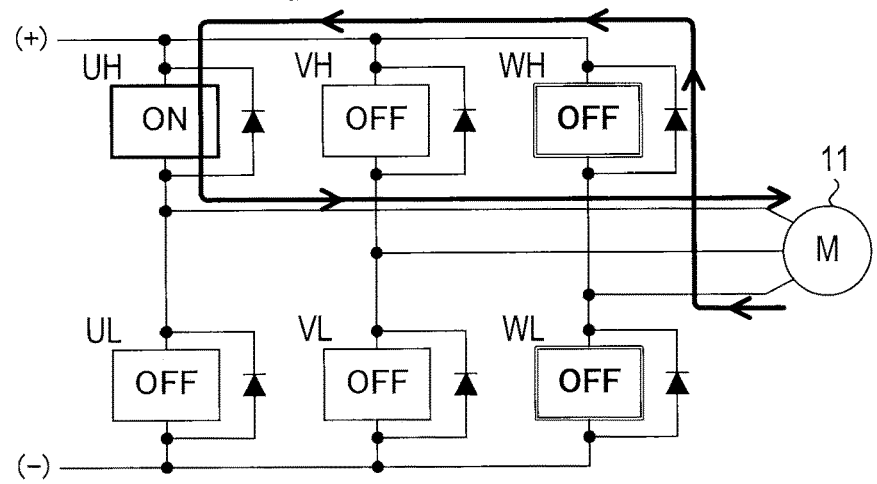
FIG. 10 shows an operation example of a brake preparation process of the first embodiment.
Figure 10:
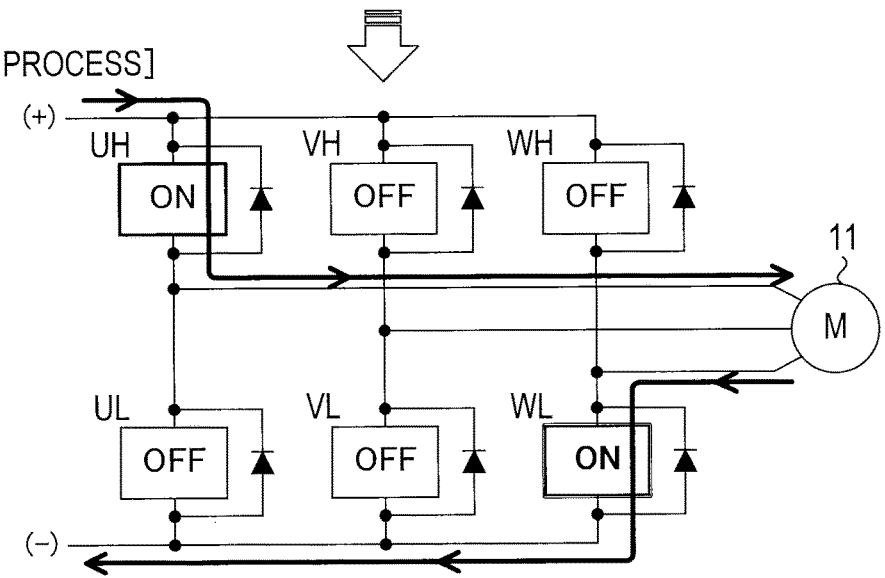
Figure 10:
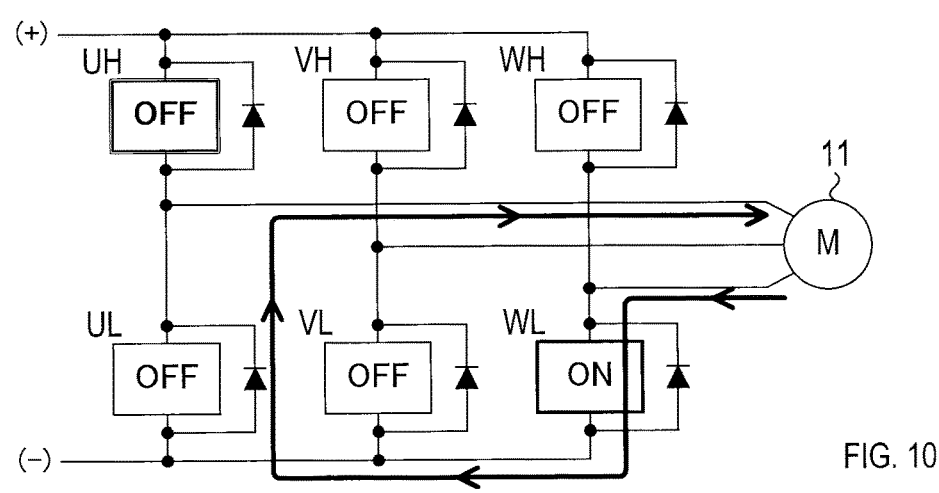

FIG. 10 schematically shows an example of the brake preparation process in response to the stop requirement being satisfied during the execution of the low-side-PWM process exemplified in FIG. 7. That is, FIG. 10 shows the brake preparation process in response to the stop requirement being satisfied when the first switch UH is held in the ON-state and the sixth switch WL is PWM driven.

As shown in FIG. 10, in the initial holding process, two switches of the PWM system just before the start of the initial holding process are held in the OFF-state. The PWM system corresponds to a system including the PWM-driven switch. In the example of FIG. 10, a W-PHASE system corresponds to the PWM system. FIG. 10 shows a state where the two switches of the W-PHASE system (i.e. the fifth and the sixth switches WH, WL) are held in the OFF-state by the initial holding process. By this initial holding process, the circulating current flows between the motor 11 and the motor driver 31 as illustrated in FIG. 10. The path of the circulating current in the initial holding process exemplified in FIG. 10 is the same as the path of the circulating current during the PWM off-period exemplified in FIG. 7.

In response to the stop requirement being satisfied during the execution of the high-side-PWM process exemplified in FIG. 8, in the initial holding process, the first and the second switches UH, UL in the U-PHASE system are held in the OFF-state. In this case, the circulating current flows through a path same as that of the circulating current during the PWM off-period exemplified in FIG. 8.

In this first embodiment, the non-complementary drive is performed. Thus, the opposite side switch in the PWM system is originally held in the OFF-state. Thus, in a case of the non-complementary drive, in the initial holding process, a process to hold the opposite side switch in the OFF-state may be omitted.

The main purpose of the initial holding process is to inhibit the ocurrence of the arm-shorting in the PWM system at the time of executing the first process. In order to achieve the main purpose, the initial holding process has a secondary purpose to hold the opposite side switch in the PWM system in the OFF-state. In a case of the non-complementary drive, the opposite side switch in the PWM system is originally held in the OFF-state. Thus, in the non-complementary drive, the initial holding process may be omitted. That is, in this case, the first process may be executed in response to the stop requirement being satisfied.

The time required for the initial holding process may be the time sufficient to achieve the above-mentioned main purpose. That is, the time required for the initial holding process should be at least equal to or more than a period of minimum time (e.g., several microseconds) necessary to hold the opposite side switch in the PWM system in the OFF-state. The first control circuit 32 continues the initial holding process for the required time, and then performs the first process.

As described above, the first process is executed based on the low-side-PWM process being executed when the stop requirement being satisfied. In the first process, the PWM-driven LSS is held in the ON-state. FIG. 10 shows that the sixth switch WL is held in the ON-state by the first process. This first process makes the motor current flow in a path similar to the path in the PWM on-period.

The main purpose of the first process is to hold the PWM-driven LSS in the ON-state. Thus, the time required for the first process should be a period of time (e.g. several microseconds or more) sufficient to hold the PWM-driven LSS in the ON-state. After the execution of the first process, the first control circuit 32 executes the second process.

In the second process, all the high-side switches are held in the OFF-state. FIG. 10 shows a state where the first, third, fifth switches UH, VH, WH are held in the OFF-state by the second process. By this second process, the circulating current flows between the motor 11 and the low side of the motor driver 31. As shown in FIG. 10, a path of the circulating current in this case runs from the third terminal 11c to the motor 11 via the sixth switch WL and the second diode D2. This path is the same as the path of the circulating current occurred when the high-side-PWM process is shifted to the initial holding process during the execution of the high-side-PWM process.

The main purpose of the second process is to flow a circulating current via the low-side switch without flowing through the high-side switch. Thus, the time required for the second process should be a period of time (e.g. several microseconds or more) sufficient to hold all the high-side switches in the OFF-state. After the execution of the second process, the first control circuit 32 proceeds to the brake process.

In the constant rotation control, any one of the high-side switches is turned on, and the other two high-side switches are held in the OFF-state. Thus, a target of the second process may be only the high-side switch held in the ON-state at the start of the second process.

2-1-5. Supplementary Explanation of Constant Rotation Control and Stop Control

Figure 11:
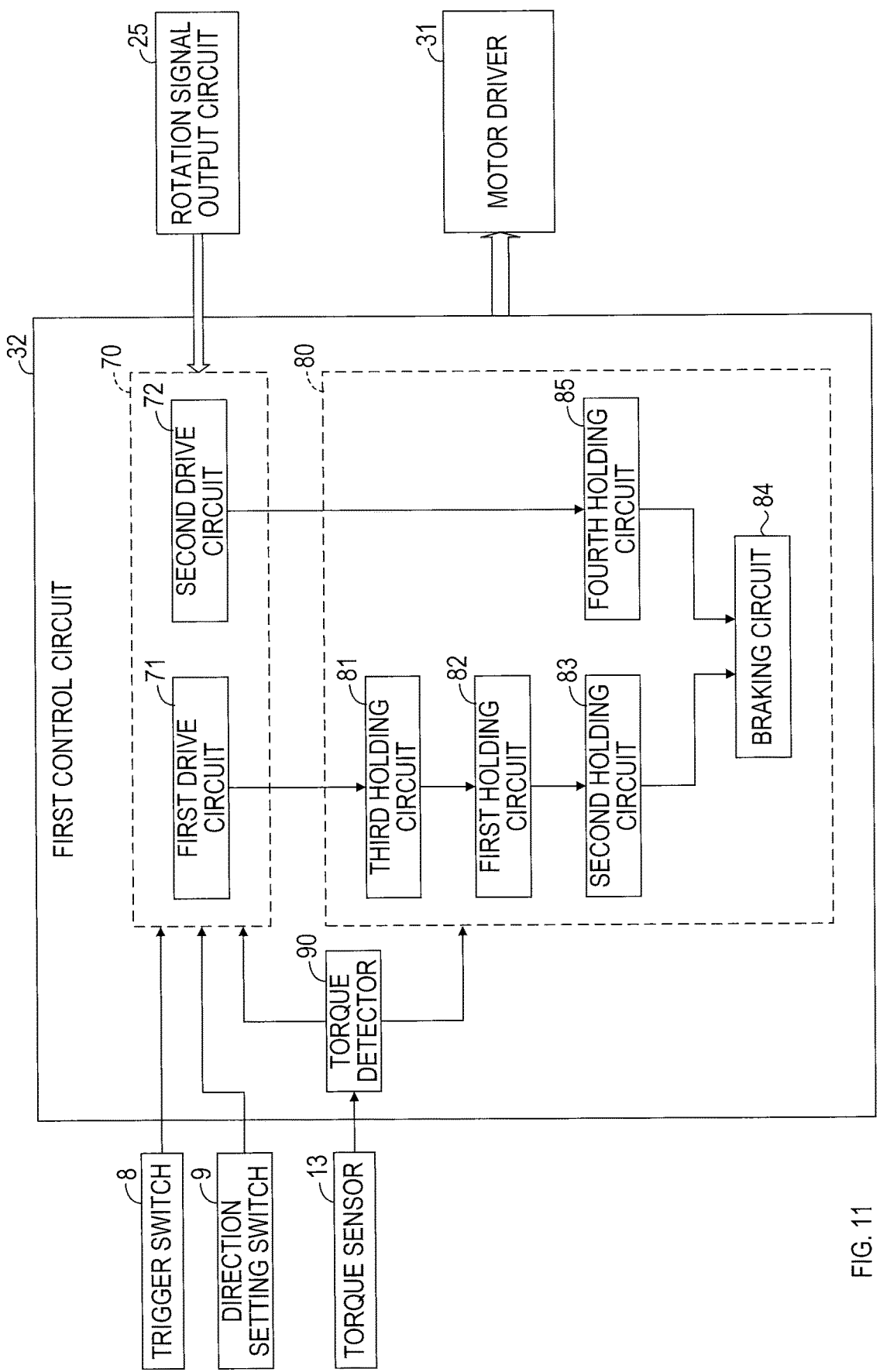
FIG. 11 is a block diagram showing functions of the first control circuit of the first embodiment.

A description will be supplementary made on the above-described constant rotation control and the stop control with reference to FIG. 11. Some or all of the constant rotation control are implemented in accordance with a program, i.e. by software processing as described below. That is, the first control circuit 32 functions as shown in FIG. 11 by executing the software.

Specifically, the first control circuit 32 includes a drive controller 70, a brake controller 80, and a torque detector 90. The torque detector 90 receives the torque detection signal from the torque sensor 13. The torque detector 90 detects the load torque based on the torque detection signal.

A part or all of the drive controller 70 corresponds to functions implemented by the software of the constant rotation control. The drive controller 70 receives rotational position information from the rotation signal output circuit 25. Furthermore, the drive controller 70 (i) receives the trigger detection signal from the trigger switch 8, (ii) receives the direction setting signal from the direction setting switch 9, and (iii) receives data indicating a magnitude of the load torque from the torque detector 90. The drive controller 70 can obtain the magnitude of the load torque based on the data.

A part or all of the brake controller 80 corresponds to functions implemented by the software of the stop control. The brake controller 80 receives the data indicating the magnitude of the load torque from the torque detector 90 and the brake controller 80 can obtain the magnitude of the load torque based thereon. In response to the stop requirement being satisfied during the execution of the constant rotation control, the brake controller 80 is activated.

The drive controller 70 includes a first drive circuit 71 and a second drive circuit 72. The first drive circuit 71 performs the above-mentioned low-side-PWM process. The second drive circuit 72 performs the above-mentioned high-side-PWM process.

The brake controller 80 includes a first holding circuit 82, a second holding circuit 83, a third holding circuit 81, a braking circuit 84 and a fourth holding circuit 85.

In response to the stop requirement being satisfied during the execution of the low-side-PWM process by the first drive circuit 71, the third holding circuit 81 performs the above-mentioned initial holding process. That is, the two switches of the PMW system are held in the OFF-state.

The first holding circuit 82 performs the above-mentioned first process based on the third holding circuit 81 being activated. That is, a PWM-driven switch of the two switches in the PWM system is held in the ON-state.

The second holding circuit 83 performs the above-mentioned second process based on the first holding circuit 82 being activated. That is, all the high-side switches are held in the OFF-state.

The braking circuit 84 performs the above-mentioned brake process based on the second holding circuit 83 being activated.

In response to the stop requirement being satisfied during the execution of the high-side-PWM process by the second drive circuit 72, the fourth holding circuit 85 performs the above-mentioned initial holding process. That is, the two switches in the PMW system are held in the OFF-state. The braking circuit 84 performs the above-mentioned brake process also in response to the fourth holding circuit 63 being activated.

2-1-6. Motor Control Process

Figure 12:
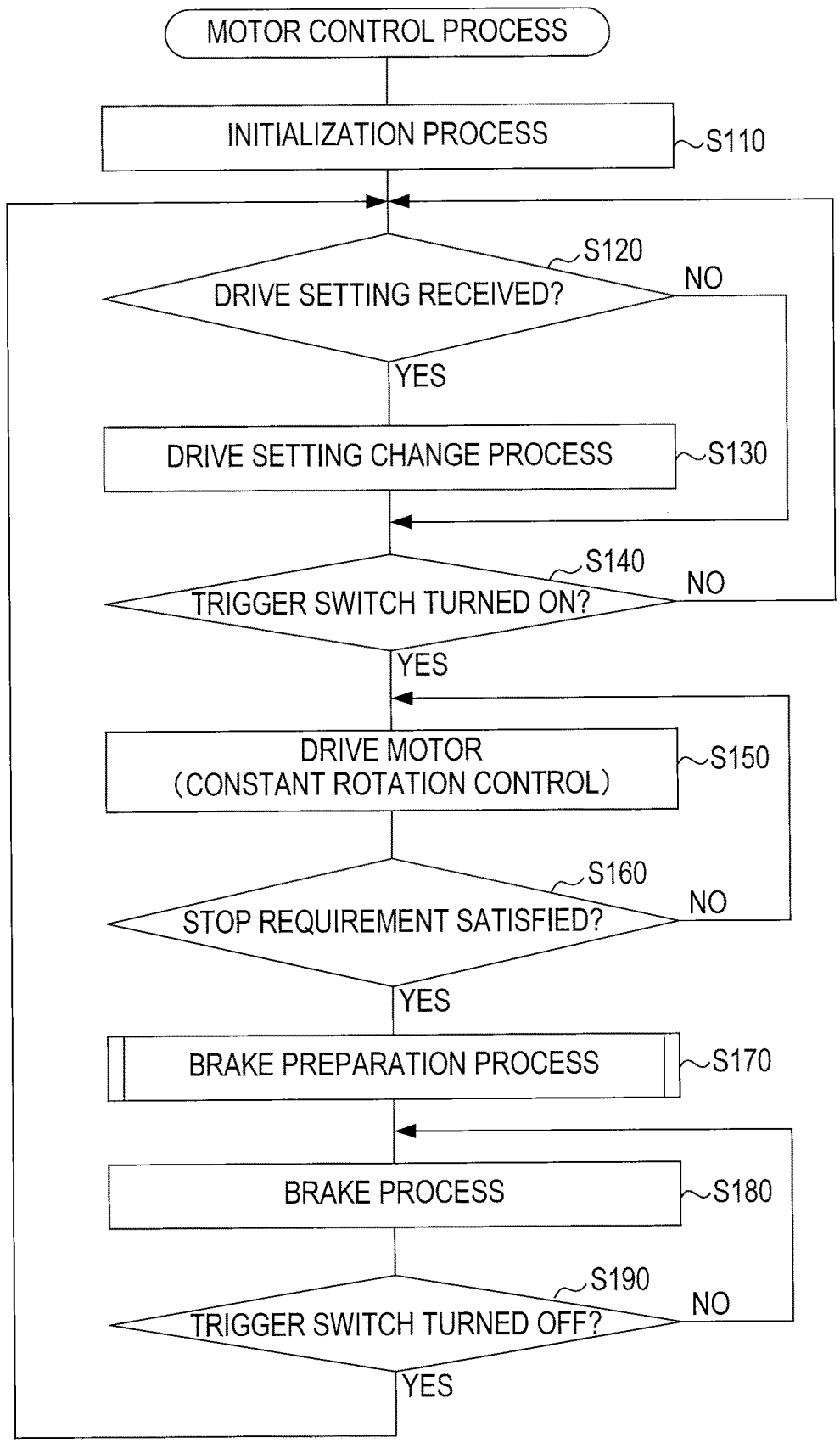
FIG. 12 is a flow chart of a motor control process of the first embodiment.

With reference to FIG. 12, a description will be made on the motor control process executed by the first control circuit 32 (more specifically, executed by the CPU 32a). The above-mentioned constant rotation control and the stop control is performed in this motor control process. Upon activation, the first control circuit 32 executes the motor control process.

Upon starting the motor control process, the first control circuit 32 performs an initialization process in S110. The initialization process includes, for example, a setting of each port in the CPU 32a. The initialization process includes, for example, obtaining the drive setting (e.g. the above-mentioned default option) from the second control circuit 40 to set the desired rotational speed and the fastening completion requirement included in the drive setting in the first control circuit 32.

In S120, the first control circuit 32 determines whether to have received the drive setting from the second control circuit 40. In response to the drive setting being changed by the user, the second control circuit 40 notifies the first control circuit 32 of the changed drive setting. If the first control circuit 32 has not received the drive setting from the second control circuit 40, this process proceeds to S140. If the first control circuit 32 has received the drive setting from the second control circuit 40, this process proceeds to S130.

In S130, the first control circuit 32 executes a drive setting change process. Specifically, the first control circuit 32 updates settings for the desired rotational speed, the fastening completion requirement and the like in the first control circuit 32 based on the drive setting received in S120. This process proceeds to S140 after the process of S130 is executed.

In S140, the first control circuit 32 determines whether the trigger switch 8 is turned on. If the trigger switch 8 is not turned on, this process proceeds to S120. If the trigger switch 8 is turned on, this process proceeds to S150. In S150, the first control circuit 32 drives the motor 11. Specifically, the above-mentioned constant rotation control is started.

After the constant rotation control is started (i.e. during the execution of the constant rotation control), the first control circuit 32 determines whether the stop requirement is satisfied in S160. If the stop requirement is not satisfied, this process proceeds to S150 and continues to execute the constant rotation control. If the stop requirement is satisfied, this process proceeds to S170.

Figure 13:
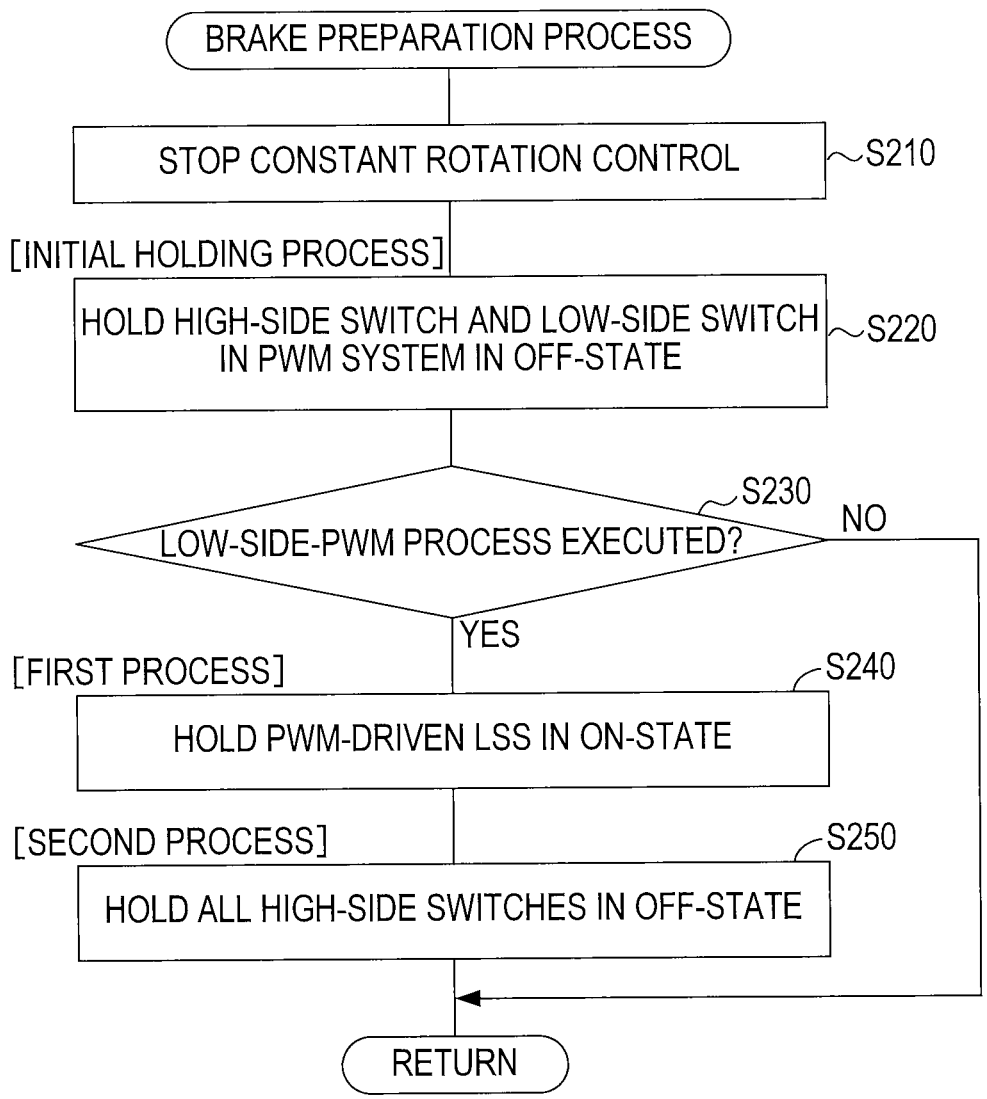
FIG. 13 is a flow chart of the brake preparation process of the first embodiment.

In S170, the first control circuit 32 executes the brake preparation process. Details of the brake preparation process is shown in FIG. 13. In response to the first control circuit 32 starting the brake preparation process, the constant rotation control is stopped in S210. In S220, the first control circuit 32 executes the above-mentioned initial holding process. Specifically, the first control circuit 32 holds the high-side switch and the low-side switch in the PWM system in the OFF-state. In S230, the first control circuit 32 determines whether the low-side-PWM process was executed at the time of the stop requirement having been satisfied in S160. If the high-side-PWM process was executed at the time of the stop requirement having been satisfied, the first control circuit 32 ends the brake preparation process and proceeds to S180 (see FIG. 12).

If the low-side-PWM process was executed at the time of the stop requirement having been satisfied, the first control circuit 32 executes the above-mentioned first process in S240. Specifically, the first control circuit 32 holds the PWM-driven LSS in the ON-state. After the execution of the first process, the first control circuit 32 executes the above-mentioned second process in S250. Specifically, the first control circuit 32 holds all the high-side switches in the OFF-state. After the execution of the process of S250, this process proceeds to S180 (see FIG. 12).

In S180, the first control circuit 32 executes the brake process. Specifically, in this first embodiment, the dynamic braking is activated as described above.

After the execution of the brake process, this process proceeds to S190. In S190, the first control circuit 32 determines whether the trigger switch 8 is turned off. If the trigger switch 8 is turned on, the first control circuit 32 continues the brake process in S180. If the trigger switch 8 is turned off, this process proceeds to S120. In this case, the first control circuit 32 may stop the brake process (i.e. may deactivate the dynamic braking).

2-1-7. Correspondence Between Terms

The first through third terminals 11a-11c each correspond to one example of the first to third terminals in the overview of the embodiment. The first, third, and fifth paths 61, 63, 65 each correspond to one example of the first, third, and fifth paths in the overview of the embodiment. The second, fourth, and sixth paths 62, 64, 66 each correspond to one example of the second, fourth, and sixth paths in the overview of the embodiment. The first, third, and fifth switches UH, VH, WH each correspond to one example of the first, third, and fifth switches in the overview of the embodiment. The second, fourth, and sixth switches UL, VL, WL each correspond to one example of the second, fourth, and sixth switches in the overview of the embodiment. The first, third, and fifth diodes D1, D3, D5 each correspond to one example of the second rectifier in the overview of the embodiment. The second, fourth, and sixth diodes D2, D4, D6 each correspond to one example of the first rectifier in the overview of the embodiment.

2-2. Second Embodiment

The constant rotation control and the stop control in a case of the complementary drive will be described as a second embodiment. The second embodiment is different from the first embodiment basically in that the complementary drive is performed in the constant rotation control.

Figure 14:
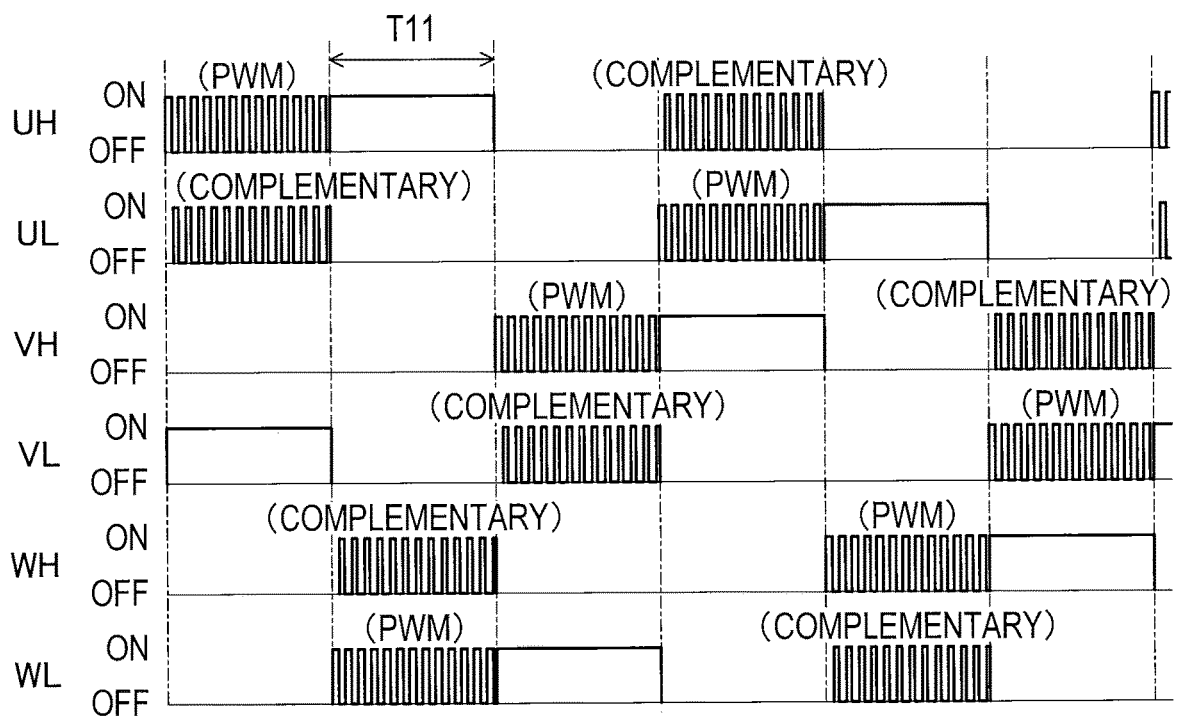
FIG. 14 is a timing chart showing a third drive pattern of a second embodiment.
Figure 15:
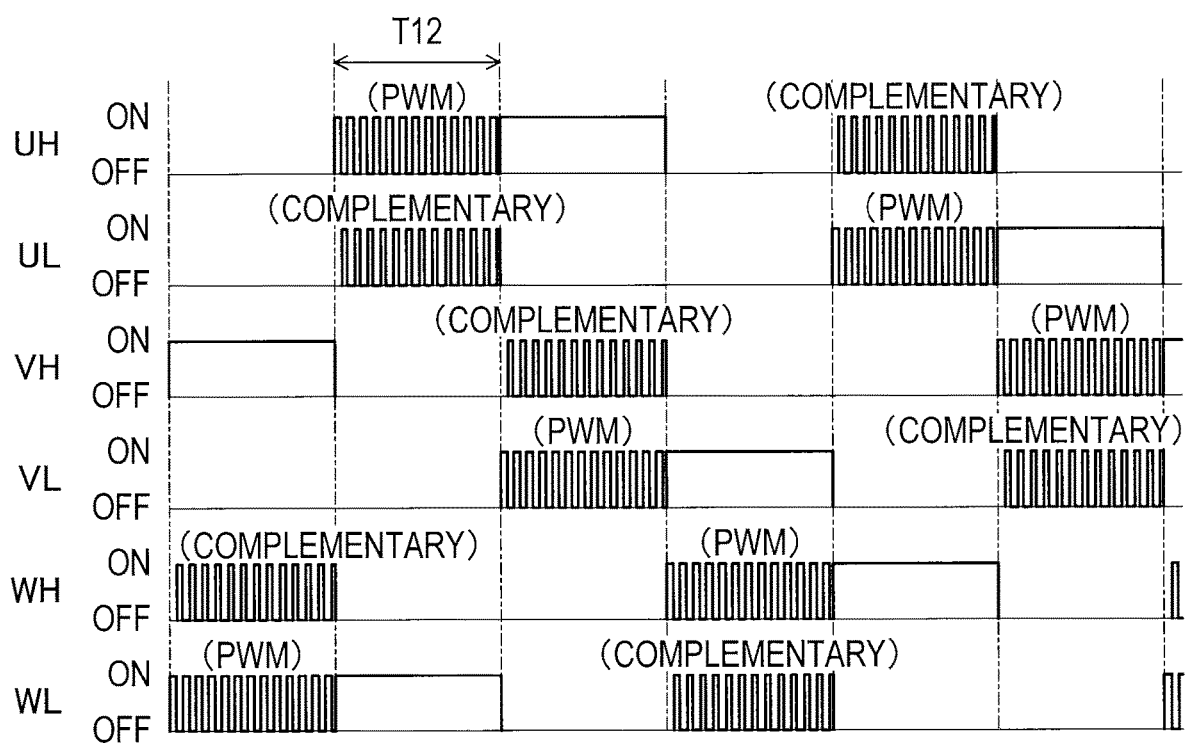
FIG. 15 is a timing chart showing a fourth drive pattern of the second embodiment.

In the second embodiment, for example, the first through six switches UH-WL are driven in accordance with a third drive pattern exemplified in FIG. 14 or a fourth drive pattern exemplified in FIG. 15. In FIG. 14 and FIG. 15, the expression of "(complementary)" means that the switch is complementary driven.

In FIG. 14, the low-side-PWM process is performed, for example, during a time period T11. Specifically, the first switch UH is set to the ON-held HSS, and held in the ON-state. Furthermore, the sixth switch WL is set to the PWM-driven LSS and is PWM driven. Furthermore, the fifth switch WH is complementary driven in accordance with the PWM drive of the sixth switch WL. The path of the electric current during this period T11 is basically similar to the path shown in FIG. 7. In FIG. 7, the fifth switch WH is turned off during the PWM off-period. However, the fifth switch WH is turned on in at least a part of the PWM off-period when the complementary drive is performed. In this case, the circulating current flows through the fifth switch WH while the fifth switch WH is turned on.

In FIG. 15, the high-side-PWM process is performed, for example, during a time period T12. Specifically, the sixth switch WL is set to the ON-held LSS, and held in the ON-state. Furthermore, the first switch UH is set to the PWM-driven HSS and is PWM driven. Furthermore, the second switch UL is complementary driven in accordance with the PWM drive of the first switch UH. The path of the electric current during this period T12 is basically similar to the path shown in FIG. 8. In FIG. 8, the second switch UL is turned off during the PWM off-period. However, the second switch UL is turned on in at least a part of the PWM off-period when the complementary drive is performed. In this case, the circulating current flows through the second switch UL while the second switch UL is turned on.

In the second embodiment, as in the first embodiment, the motor control process (see FIG. 12 and FIG. 13) is also executed. In the motor control process of the second embodiment, the complementary drive is performed in S150.

2-3. Third Embodiment

A description will be made on a brake preparation process different from the brake preparation process of the first embodiment. The third embodiment is different from first embodiment basically only in the brake preparation process. As one example, FIG. 16 assumes a state in which the low-side-PWM process is executed and the non-complementary drive is performed. More specifically, FIG. 16 assumes a state in which the first switch UH is set to the ON-held HSS and the sixth switch WL is switched to the ON-state. In a case where the stop requirement is satisfied and the process proceeds to the brake preparation process in such a state, the first control circuit 32 does not stop the constant rotation control immediately, and does not start the first process immediately.

Figure 16:
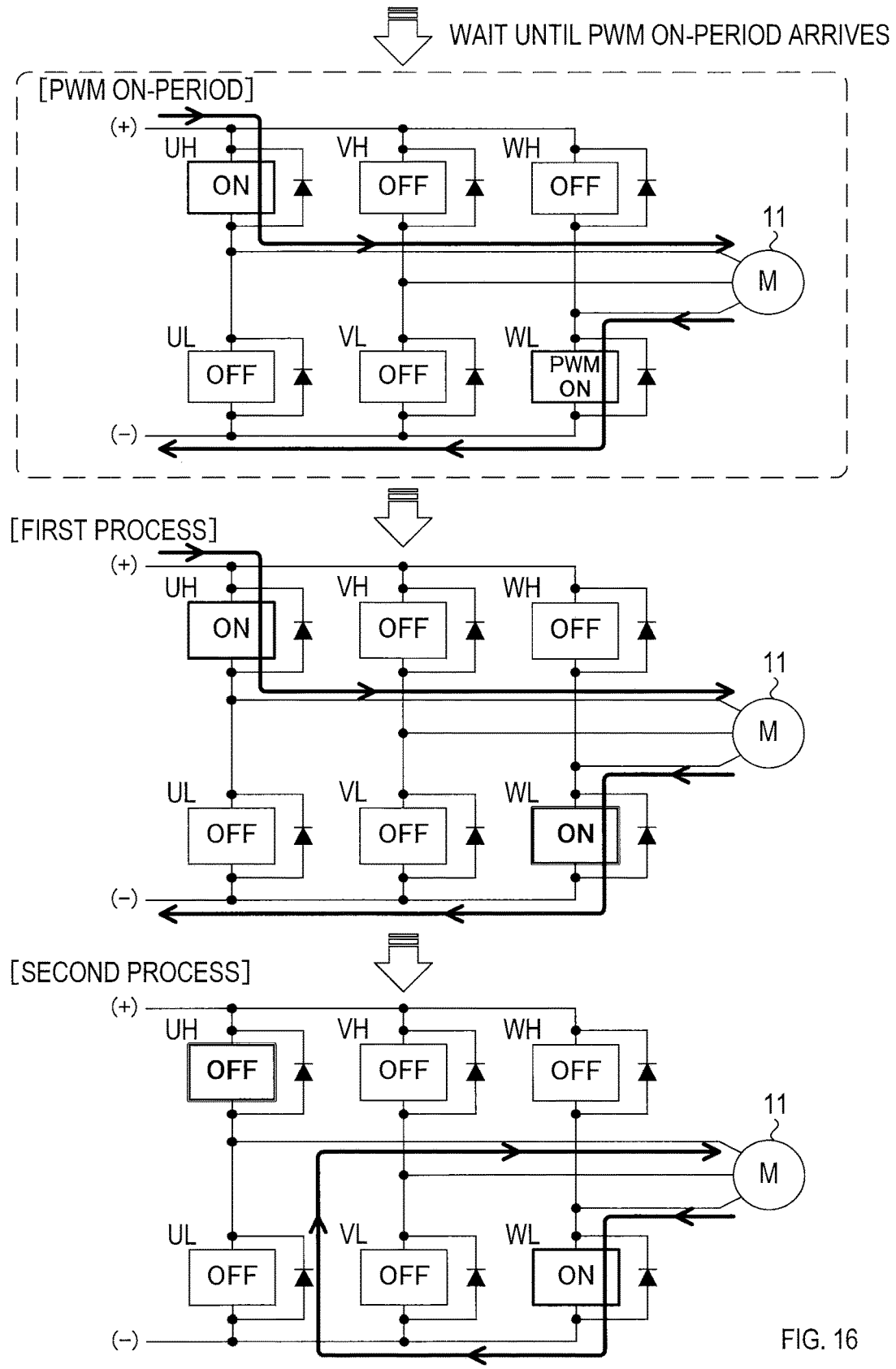
FIG. 16 shows an operation example of a brake preparation process of a third embodiment.

In the third embodiment, upon the start of the brake preparation process in response to the stop requirement being satisfied, the first control circuit 32 waits until the PWM on-period in the constant rotation control arrives. In the example of FIG. 16, the first control circuit 32 waits until the sixth switch WL that is set to the PWM-driven LSS is switched to the ON-state.

Upon arrival of the PWM on-period, the first control circuit 32 executes the first process. After the execution of the first process, the first control circuit 32 further executes the second process. The contents of the first process and the second process and the execution time are similar to those of the first embodiment. The brake preparation process of the third embodiment does not include the initial holding process.

In the third embodiment, as in the first embodiment, the motor control process (see FIG. 12) is also executed. However, the brake preparation process in S170 is different from the first embodiment. The brake preparation process of the third embodiment is shown in FIG. 17.

Figure 17:
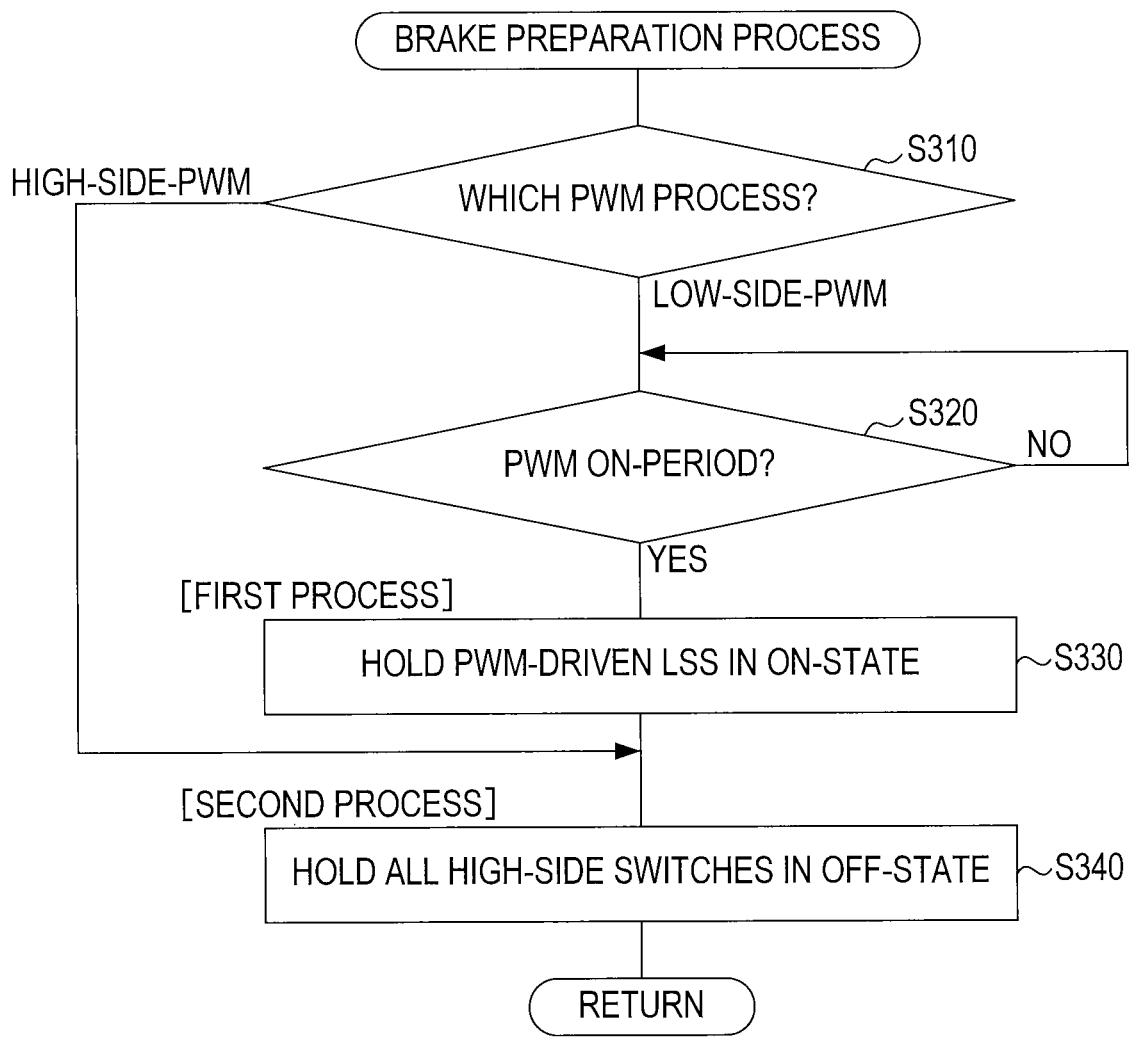
FIG. 17 is a flow chart of a brake preparation process of the third embodiment.

Upon the start of the brake preparation process of FIG. 17, the first control circuit 32 determines whether a currently running PWM process is the high-side-PWM process or the low-side-PWM process in S310. If the currently running PWM process is the high-side-PWM process, the process proceeds to S340. If the currently running PWM process is the low-side-PWM process, the process proceeds to S320.

In S320, the first control circuit 32 determines whether it is currently in the PWM on-period. If it is in the PWM off-period, the first control circuit 32 repeats the determination of S320 until the PWM on-period arrives. If it is in the PWM on-period, the process proceeds to S330.

In S330, the first control circuit 32 executes the first process. Specifically, the PWM-driven LSS is held in the ON-state. In the PWM on-period, the high-side switch (i.e. the opposite side switch) in the same system as the PWM-driven LSS is turned off in both of the complementary drive and the non-complementary drive. Thus, it is not necessary to perform a process to hold the high-side switch in the OFF-state. However, the process to hold the high-side switch in the OFF-state may be performed in S330.

In S340, the first control circuit 32 executes the second process. Specifically, all the high-side switches are held in the OFF-state. After the execution of the process of S340, this process proceeds to S180 (see FIG. 12).

In the third embodiment, the motor control process (see FIG. 12) is also executed. In the motor control process of the third embodiment, the complementary drive or the non-complementary drive is performed in S150.

2-4 Other Embodiments

Some embodiments of the present disclosure have been described; however, the present disclosure may be embodied in various forms without limited to the above-described embodiments.

2-4-1.

The first control circuit 32 may obtain the load torque in any manner. The first control circuit 32 may detect the load torque based on a current detection signal input from the current detection circuit 33 (i.e. based on a motor current value). Specifically, the torque detector 90 (see FIG. 11) may receive the current detection signal from the current detection circuit 33. Then, the torque detector 90 may detect the load torque based on the current detection signal. The motor current value is generally varied in accordance with the load torque. That is, the motor current values increases as the load torque increases. Thus, it is possible to calculate (or estimate) the load torque based on the motor current value.

2-4-2.

The motor 11 may be in a form different from the brushless DC motor. The motor driver 31 may be in a form different from the 3-phase full-bridge circuit. For example, the motor 11 may be in the form of a brushed DC motor and the motor driver 31 may be in the form of an H-BRIDGE CIRCUIT. The H-BRIDGE CIRCUIT includes four switches. The H-BRIDGE CIRCUIT corresponds to a circuit in which the fifth and sixth switches WH, WL are omitted from the motor driver 31 of FIG. 4, for example.

2-4-3.

The present disclosure is applicable to electric power tools different form the rechargeable screwdriver. For example, the present disclosure may be applied to rechargeable driver drills. The present disclosure is not limited to applications to electric power tools driven by battery power.

The present disclosure may be applied to electric power tools configured to be driven by receiving, for example, AC power.

2-4-4.

A plurality of functions of one element of the aforementioned embodiments may be performed by a plurality of elements, and one function of one element may be performed by a plurality of elements. Furthermore, a plurality of functions of a plurality of elements may be performed by one element, and one function performed by a plurality of elements may be performed by one element. A part of the configurations of the aforementioned embodiments may be omitted. Furthermore, at least part of the configurations of the aforementioned embodiments may be added to or replaced with the configurations of the other above-described embodiments.

What is claimed is:

1. An electric-powered screwdriver comprising:
   a battery including a positive electrode and a negative electrode;
   a motor including a first terminal and a second terminal;
   an output shaft configured (i) to be attached to a tip tool and (ii) to receive a rotational force of the motor to thereby be driven;
   a trigger switch configured to be pulled by a user of the electric-powered screwdriver;
   a first path configured to electrically connect the first terminal to the positive electrode;
   a second path configured to electrically connect the second terminal to the negative electrode;
   a third path configured to electrically connect the second terminal to the positive electrode;
   a fourth path configured to electrically connect the first terminal to the negative electrode;
   first through fourth switches respectively on the first through fourth paths, the first through fourth switches being configured to be switched between an ON-state and an OFF-state, the first through fourth switches in the ON-state being configured to respectively complete the first through fourth paths, and the first through fourth switches in the OFF-state being configured to respectively interrupt the first through fourth paths;
   a drive circuit configured, based on the trigger switch being pulled, to switch the first switch to the ON-state and also output a drive signal to the second switch, the drive signal being in the form of a pulse width modulated signal;
   a first holding circuit configured to hold the second switch in the ON-state based on the motor being required to stop while the drive circuit is activated;
   a second holding circuit configured to hold the first switch in the OFF-state based on the second switch being held in the ON-state; and
   a braking circuit configured to hold the second switch and the fourth switch in the ON-state based on the first switch being held in the OFF-state.

2. An electric power tool comprising:
   a motor including a first terminal and a second terminal;
   a first path configured to electrically connect the first terminal to a positive electrode of a DC power supply;
   a second path configured to electrically connect the second terminal to a negative electrode of the DC power supply;
   first and second switches respectively on the first and second paths, the first and second switches being configured to be switched between an ON-state and an OFF-state, the first and second switches in the ON-state being configured to respectively complete the first and second paths, and the first and second switches in the OFF-state being configured to respectively interrupt the first and second paths;
   a first drive circuit configured (i) to switch the first switch to the ON-state and (ii) to output a first drive signal to the second switch, the first drive signal being in the form of a pulse width modulated signal;
   a first holding circuit configured to hold the second switch in the ON-state while the first drive circuit is activated; and
   a second holding circuit configured to hold the first switch in the OFF-state based on the second switch being held in the ON-state.

3. The electric power tool according to claim 2,
   wherein the first holding circuit is configured to hold the second switch in the ON-state based on the motor being required to stop while the first drive circuit is activated.

4. The electric power tool according to claim 3, further comprising:
   a torque detector configured to detect a magnitude of a load torque, the load torque being applied to the motor,
   wherein the motor is required to stop in response to the magnitude of the load torque having reached a threshold.

5. The electric power tool according to claim 2, further comprising:
   a third path configured to electrically connect the second terminal to the positive electrode;
   a fourth path configured to electrically connect the first terminal to the negative electrode; and
   third and fourth switches respectively on the third and fourth paths, the third and fourth switches being configured to be switched between the ON-state and the OFF-state, the third and fourth switches in the ON-state being configured to respectively complete the third and fourth paths, and the third and fourth switches in the OFF-state being configured to respectively interrupt the third and fourth paths.

6. The electric power tool according to claim 5, further comprising:
   a braking circuit configured to hold the second switch and the fourth switch in the ON-state based on the first switch being held in the OFF-state.

7. The electric power tool according to claim 6,
   wherein the motor is in the form of a brushless DC motor,
   wherein the motor further includes a third terminal,
   wherein the electric power tool further includes:
   a fifth path configured to electrically connect the third terminal to the positive electrode,
   a sixth path configured to electrically connect the third terminal to the negative electrode; and
   fifth and sixth switches respectively on the fifth and sixth paths and configured to be switched between the ON-state and the OFF-state, the fifth and sixth switches in the ON-state being configured to respectively complete the fifth and sixth paths, and the fifth and sixth switches in the OFF-state being configured to respectively interrupt the fifth and sixth paths, and
   wherein the braking circuit is configured to hold the second switch, the fourth switch and the sixth switch in the ON-state based on the first switch being held in the OFF-state.

8. The electric power tool according to claim 5, further comprising:

a first rectifier connected to the fourth path so as to bypass the fourth switch, the first rectifier being configured to pass an electric current in a first unidirection, and the first unidirection being directed from the negative electrode to the first terminal via the first rectifier; and a second rectifier connected to the third path so as to bypass the third switch, the second rectifier being configured to pass an electric current in a second unidirection, and the second unidirection being directed from the second terminal to the positive electrode via the second rectifier.

9. The electric power tool according to claim 5, wherein the first drive circuit is configured to switch the third switch to the ON-state in at least a part of an off-period, the off-period corresponding to a time period when the second switch is switched to the OFF-state.

10. The electric power tool according to claim 9, further comprising:

a third holding circuit configured to hold the third switch in the OFF-state while the first drive circuit is activated, wherein the first holding circuit is configured to hold the second switch in the ON-state based on the third switch being held in the OFF-state.

11. The electric power tool according to claim 10, wherein the third holding circuit is configured to hold the third switch in the OFF-state based on the motor being required to stop while the first drive circuit is activated.

12. The electric power tool according to claim 9, wherein the first holding circuit is configured to:

wait until the first drive circuit switches the second switch to the ON-state, based on the motor being required to stop while the second switch is switched to the OFF-state, and hold the second switch in the ON-state based on the second switch being switched to the ON-state.

13. The electric power tool according to claim 5, wherein the motor is in the form of a brushless DC motor, wherein the motor further includes a third terminal, and wherein the electric power tool further includes:

a fifth path configured to electrically connect the third terminal to the positive electrode, a sixth path configured to electrically connect the third terminal to the negative electrode, and fifth and sixth switches respectively on the fifth and sixth paths and configured to be switched between the ON-state and the OFF-state, the fifth and sixth switches in the ON-state being configured to respectively complete the fifth and sixth paths, and the fifth and sixth switches in the OFF-state being configured to respectively interrupt the fifth and sixth paths.

14. The electric power tool according to claim 2, wherein the motor is in the form of a brushless DC motor.

15. The electric power tool according to claim 2, further comprising:

a second drive circuit configured (i) to switch the second switch to the ON-state and (ii) to output a second drive signal to the first switch, the second drive signal being in the form of a pulse width modulated signal, and a fourth holding circuit configured to hold the first switch in the OFF-state while the second drive circuit is activated.

16. The electric power tool according to claim 15, wherein the fourth holding circuit is configured to hold the first switch in the OFF-state based on the motor being required to stop while the second drive circuit is activated.

17. A method for controlling a motor in an electric power tool, the method comprising:

completing a first path in the electric power tool, the first path being configured to electrically connect a first terminal of the motor to a positive electrode of a DC power supply;

periodically completing or interrupting a second path in the electric power tool while the first path is completed, the second path being configured to electrically connect a second terminal of the motor to a negative electrode of the DC power supply;

subsequently maintaining completion of the first path and holding the second path completed; and subsequently interrupting the first path while the second path is held completed.

18. The method according to claim 17, further comprising completing a third path in the electric power tool after the interrupting the first path, the third path being configured to electrically connect the first terminal to the negative electrode.

19. The method according to claim 17, further comprising allowing an electric current to flow in a unidirection in a third path in the electric power tool, the third path being configured to electrically connect the first terminal to the negative electrode, the unidirection being directed from the negative electrode to the first terminal.

* * * * *